United States Patent

Inagaki et al.

[11] Patent Number: 6,034,806
[45] Date of Patent: Mar. 7, 2000

[54] LIGHT SOURCE DEVICE AND LIGHT BEAM SCANNING OPTICAL APPARATUS

[75] Inventors: Yoshihiro Inagaki; Akiyoshi Hamada; Toshio Naiki, all of Toyokawa, Japan

[73] Assignee: Minolta Co., Ltd., Osaka, Japan

[21] Appl. No.: 09/037,014

[22] Filed: Mar. 9, 1998

[30] Foreign Application Priority Data

| Mar. 10, 1997 | [JP] | Japan | 9-054339 |
| Mar. 10, 1997 | [JP] | Japan | 9-054340 |
| Mar. 10, 1997 | [JP] | Japan | 9-054341 |

[51] Int. Cl.$^7$ .................................................. G02B 26/08
[52] U.S. Cl. ............................ 359/204; 359/216; 347/243
[58] Field of Search ................... 359/204–219; 347/232–244; 358/474, 494

[56] References Cited

U.S. PATENT DOCUMENTS 5,748,355  5/1998  Shiraishi et al. .................... 359/204

FOREIGN PATENT DOCUMENTS 5-176128  7/1993  Japan .

*Primary Examiner*—James Phan
*Attorney, Agent, or Firm*—McDermott, Will & Emery

[57] ABSTRACT

A light beam scanning optical apparatus is provided which simultaneously converges a plurality of light beams on different locations in a scanning surface and thereby simultaneously writes a plurality of lines in one scanning operation. The light beam scanning optical apparatus comprises a light source having three or more light emitting points, and a converging lens which shapes light beams emitted from the light source, into generally parallel or convergent bundles of rays. The converging lens has a shape generally symmetrical with respect to the optical axis, and the light emitting points on the light source are disposed on a circle having its center generally on the optical axis. Alternatively, the light source comprises a first light source having one light emitting point, a second light source having a plurality of light emitting points, and a light beam coupling device for unifying the directions of travel of light beams emitted from the first and second light sources. Scanning with light beams of which the number is n and which have been emitted from the light source is simultaneously performed at unequal intervals with respect to the direction of sub scanning on the scanning surface, and then the following relational expressions hold:

$h_i \bmod n \neq 0$ $h_i \bmod n \neq h_j \bmod n$ $(2 \leq i \leq n, 2 \leq j \leq n, i \neq j)$ wherein $h_k$ ($2 \leq k \leq n$) is the position where the kth light beam from the front extremity of an image is condensed, which position is measured with respect to the position where the first light beam from the front extremity of the image is converged on the scanning surface, and which position is expressed in units of the interval between scanning lines required by a given image density on the scanning surface, and wherein mod is an operator for finding the remainder in the case that $h_i$ or $h_j$ is divided by n.

3 Claims, 38 Drawing Sheets

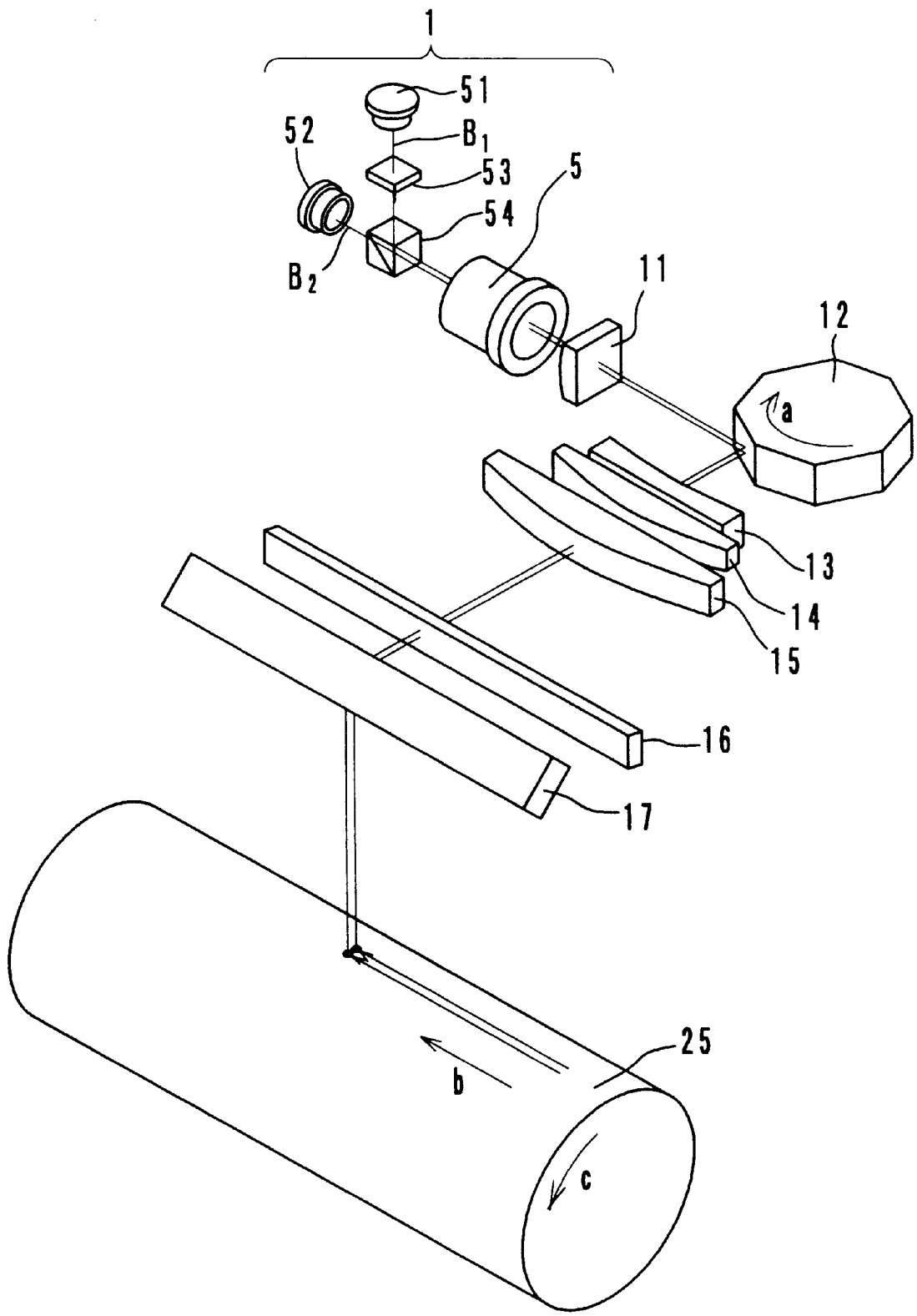
F I G. 1

F I G. 4
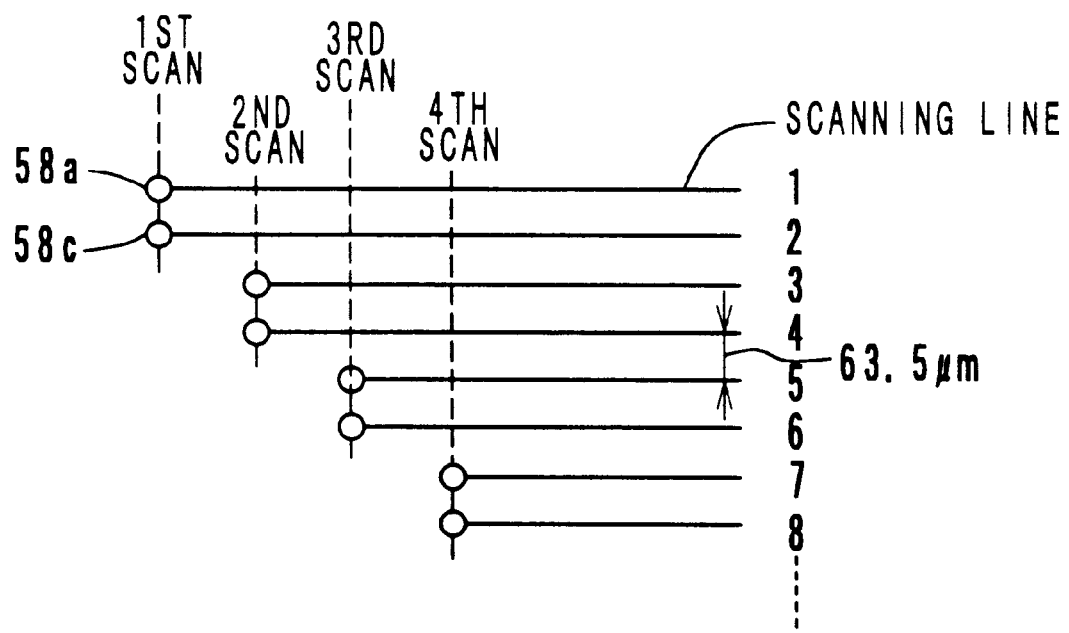

F I G. 1 2
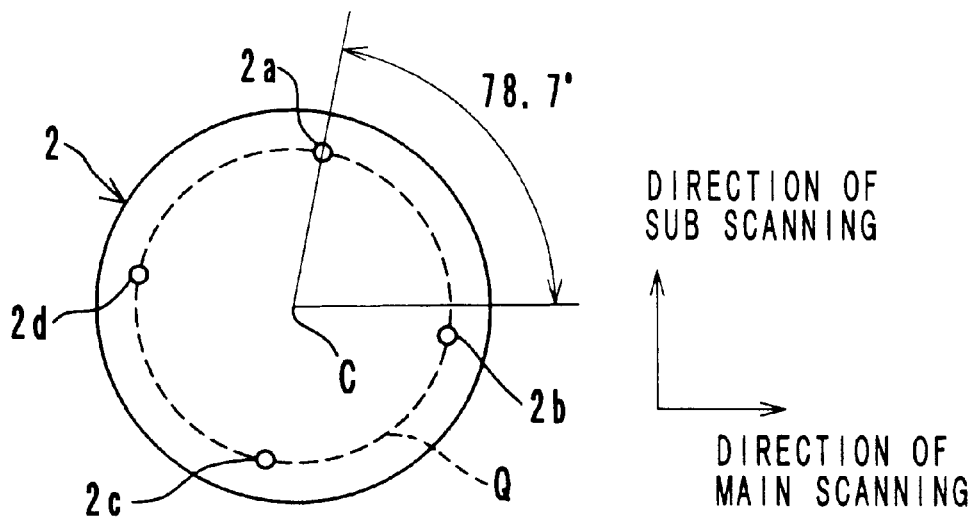
F I G. 1 3
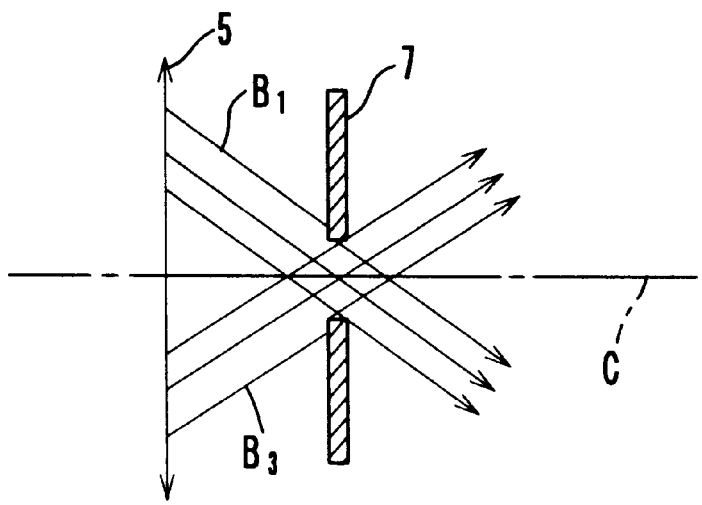

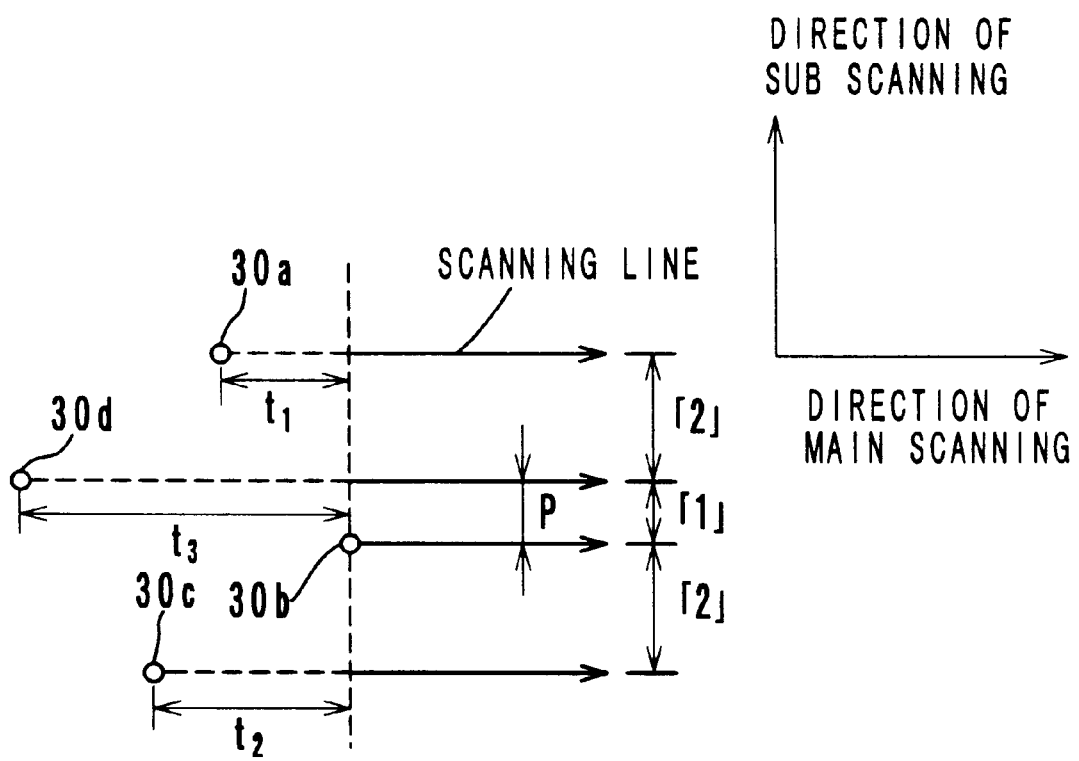
F I G. 1 4

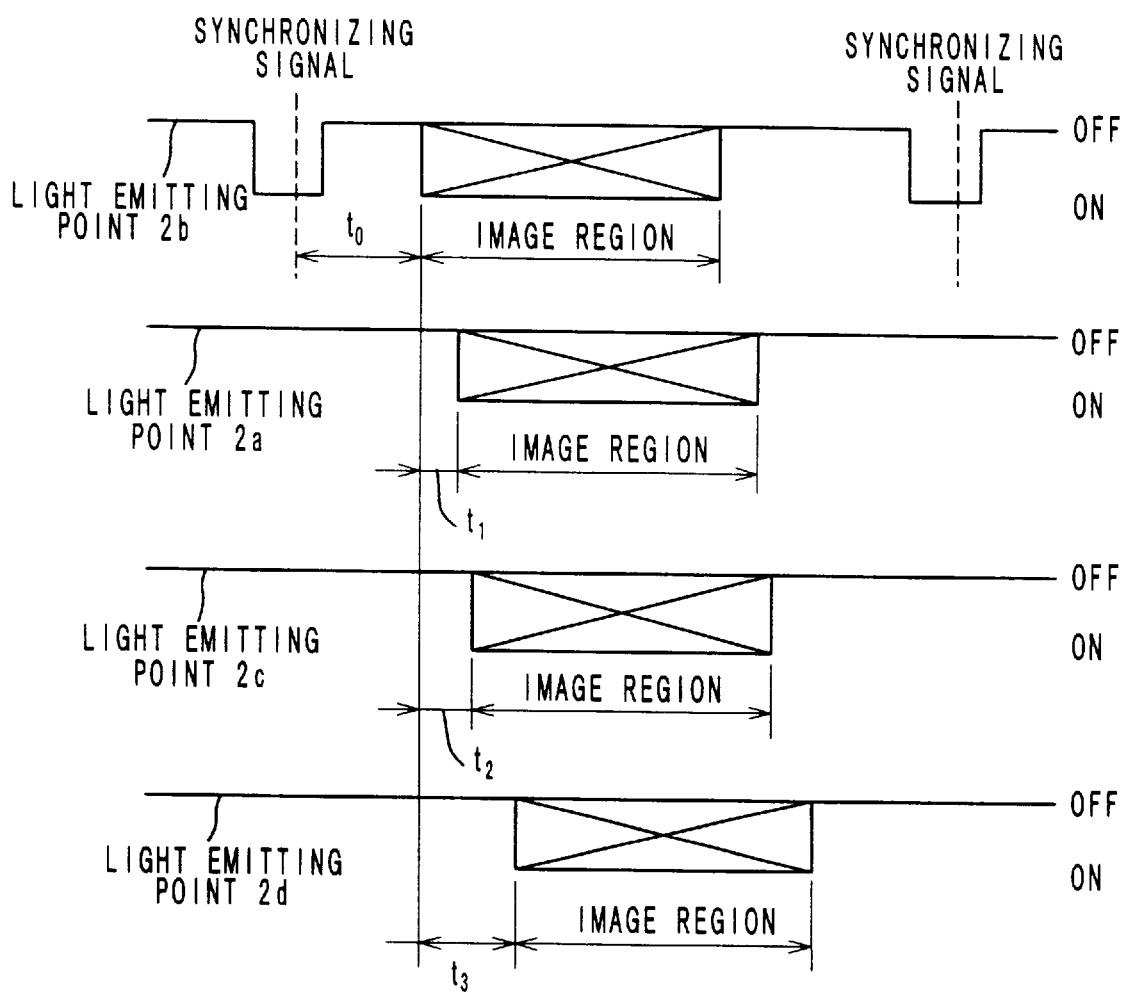

F I G. 2 7
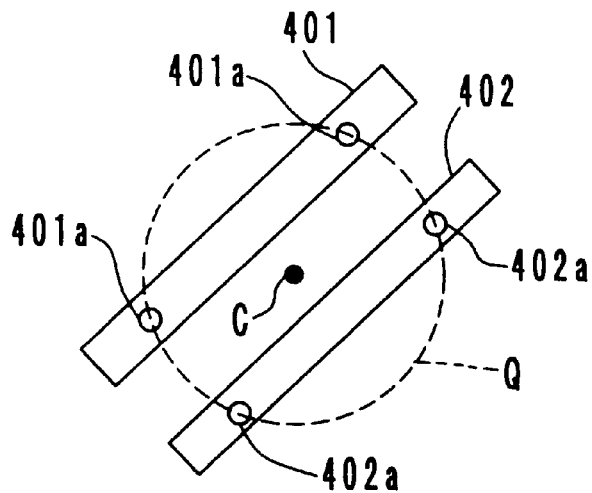
F I G. 2 8
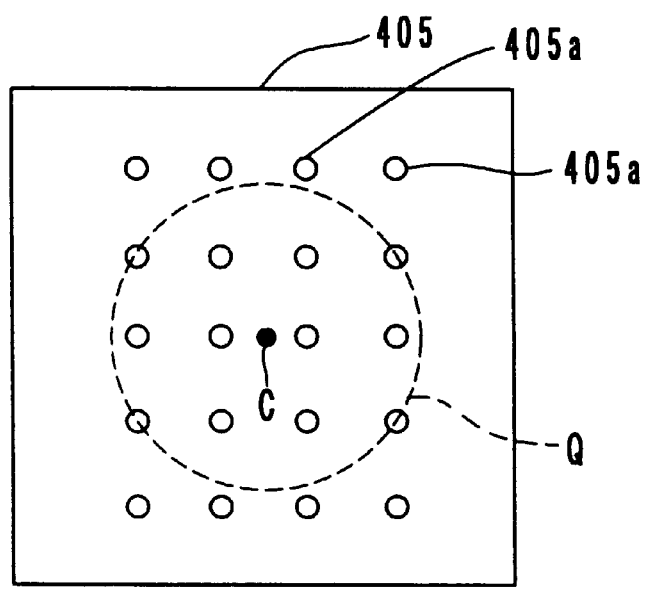

F I G. 29
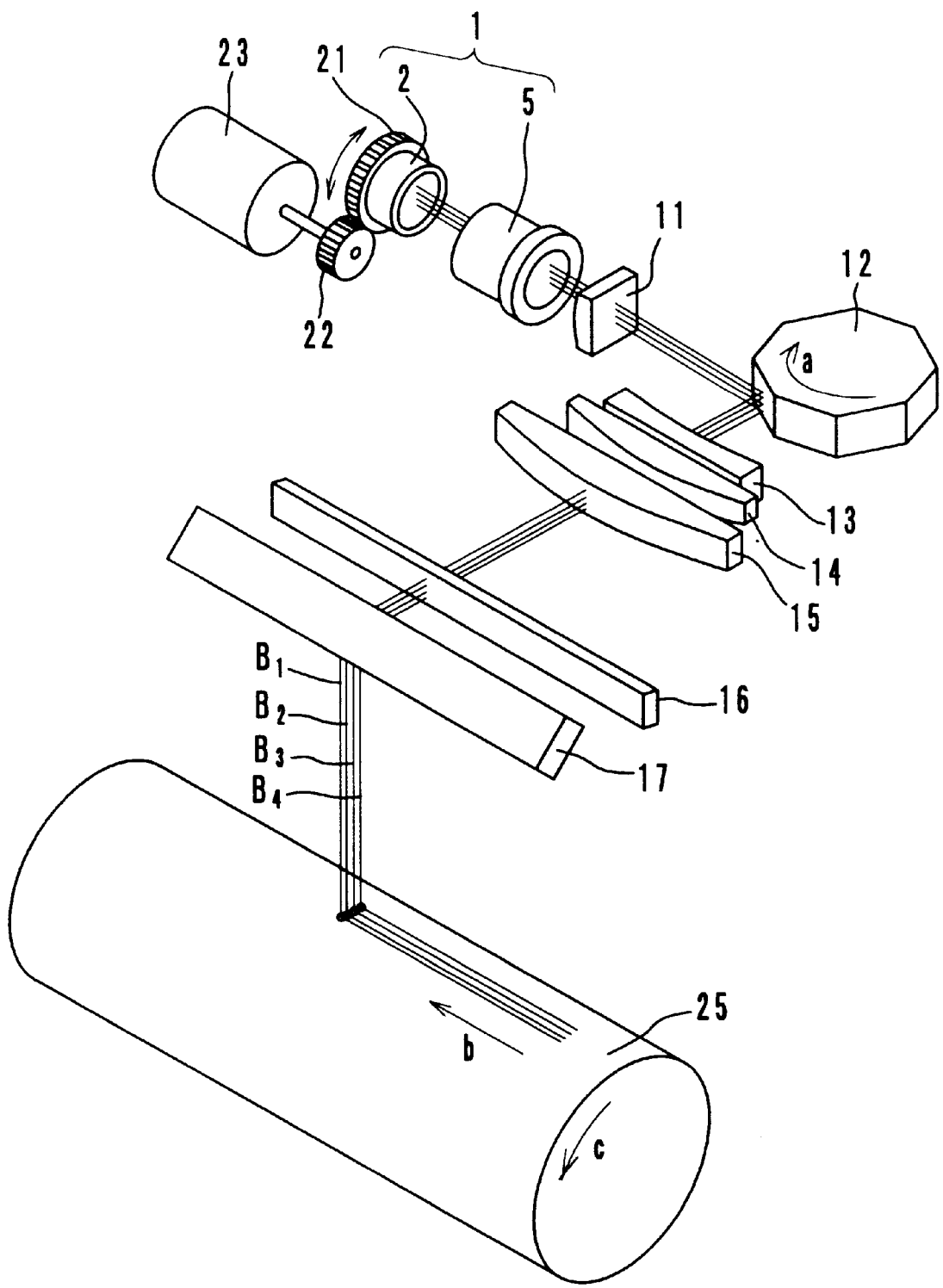

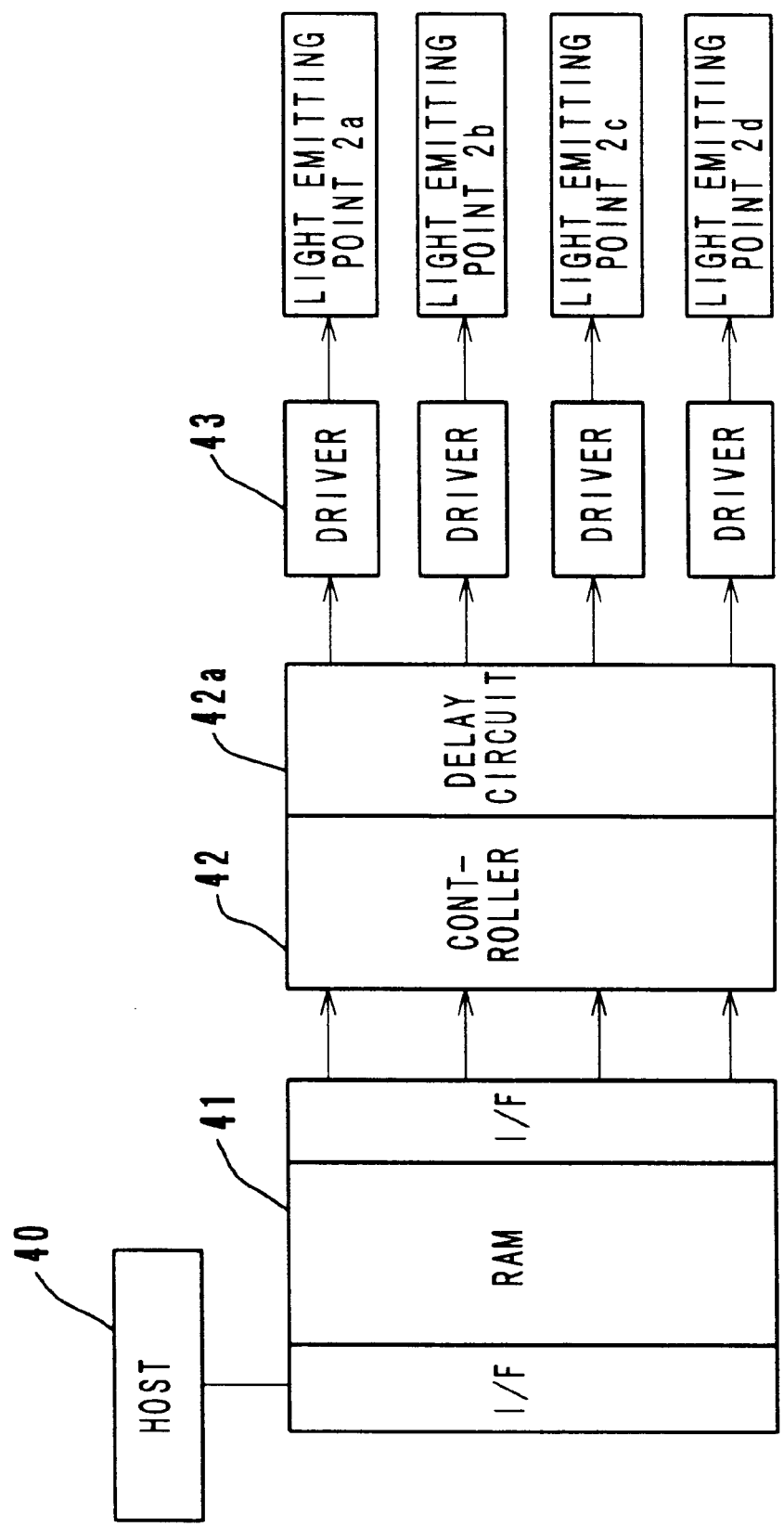
F I G. 36

F I G. 4 2
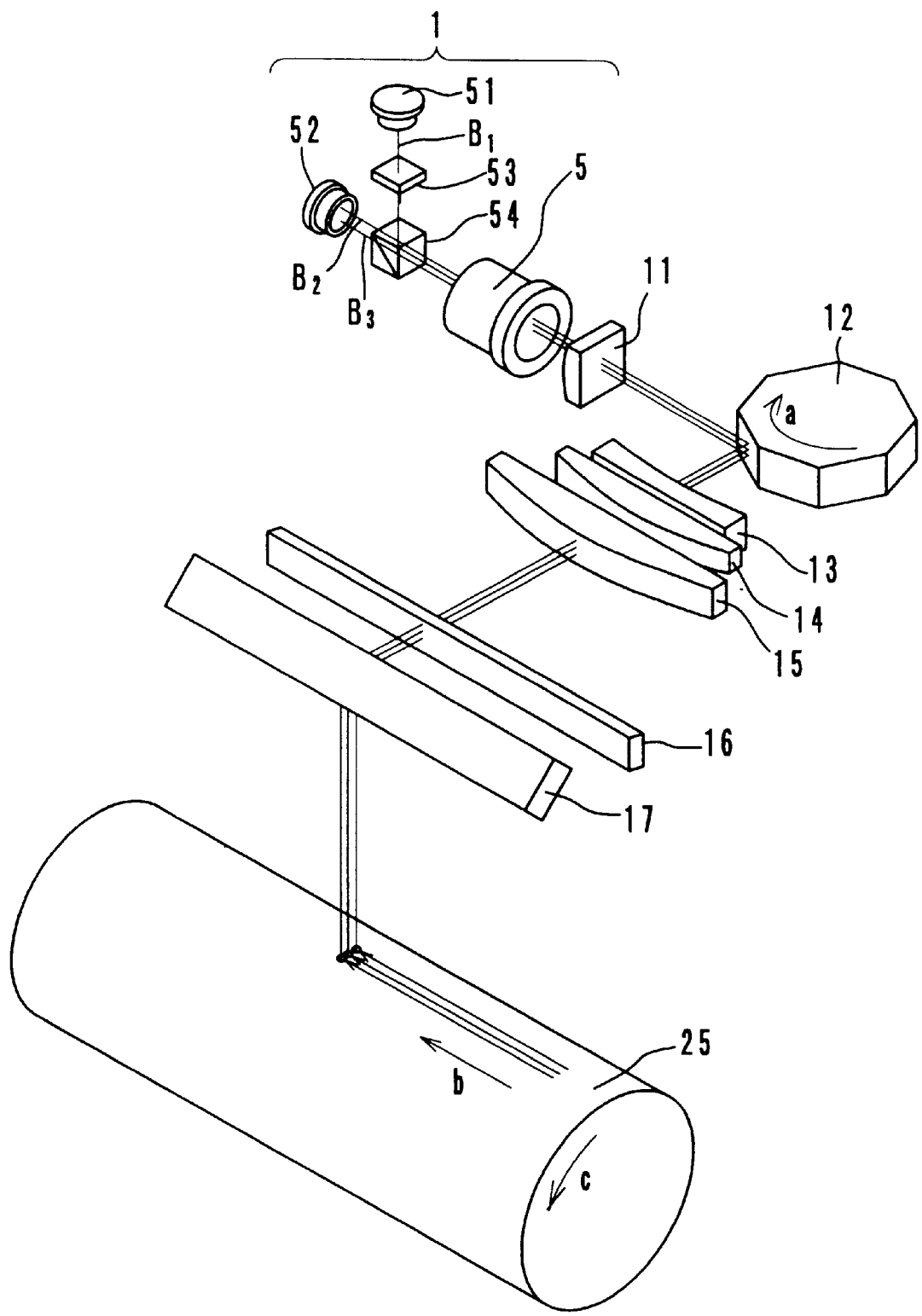

F I G. 4 3
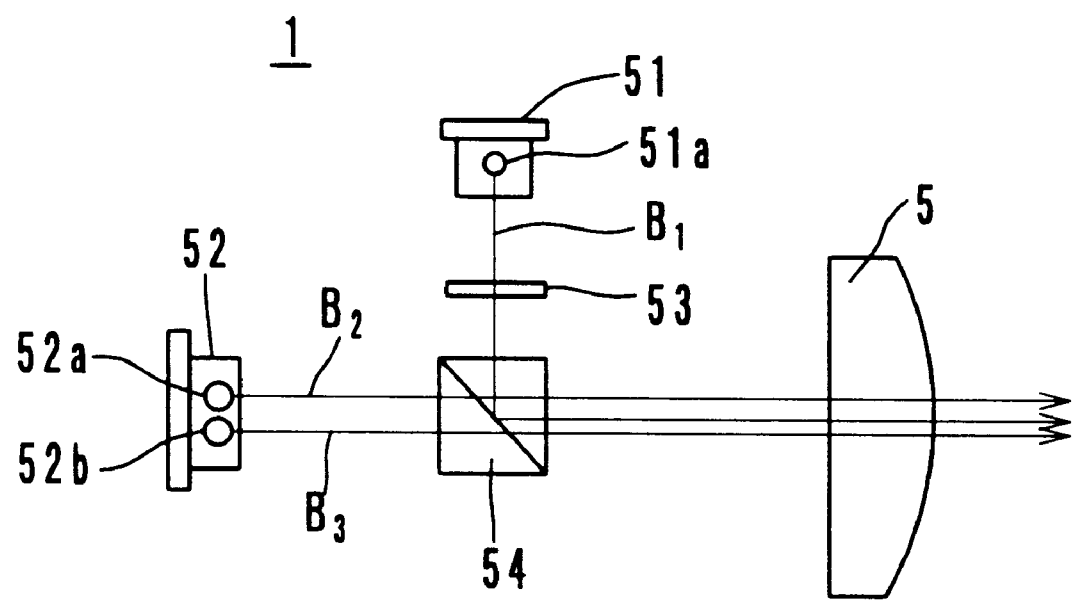

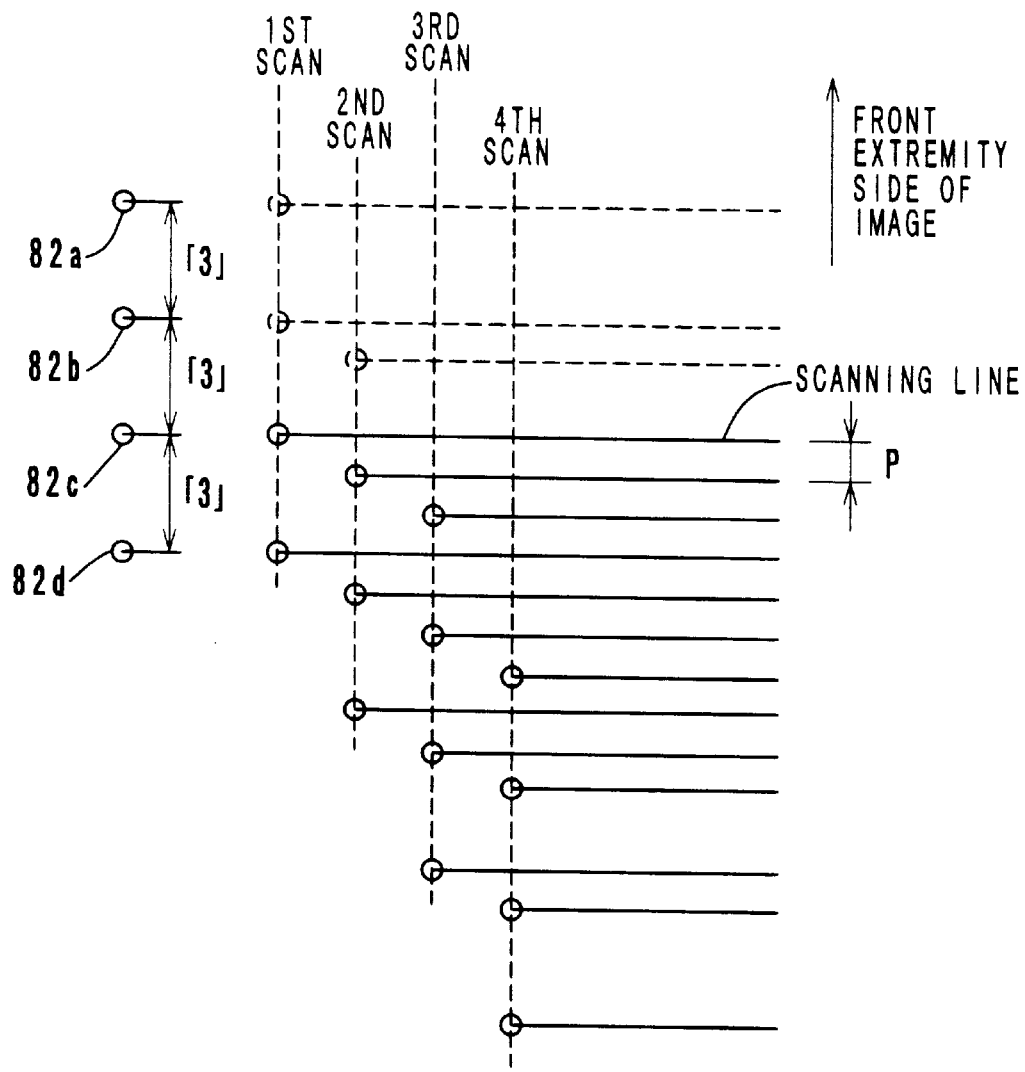

LIGHT SOURCE DEVICE AND LIGHT BEAM SCANNING OPTICAL APPARATUS

This application is based on application Nos. 9-54339, 9-54340 and 9-54341 filed in Japan, the contents of which is hereby incorporated by reference.

BACKGROUND OF THE INVENTION

1. Field of the Invention

The present invention relates to a light source device and a light beam scanning optical apparatus, and particularly relates to a light source device and a light beam scanning optical apparatus which are to be used as image writing means in a laser printer, a digital copying machine or the like.

2. Description of Prior Art

There has been known a type of light beam scanning optical apparatus which simultaneously converges a plurality of light beams on different locations on a scanning surface and thereby simultaneously writes a plurality of lines in one scanning operation.

With regard to the switching of the image densities in such a light beam scanning optical apparatus, there have been proposed a method of switching over the intervals between light beams by the movement of a prism or the like disposed ahead of a light beam coupling device along the optical path, a method of switching over the intervals between light beams by the rotation of the light source, a method of increasing or decreasing the number of active light emitting points in accordance with an image density, and the like.

The conventional light beam scanning optical apparatus, however, requires the prism in movable parts thereof to be moved with an accuracy on the order of 0.1 $\mu$m or requires the light source to be rotated at the same accuracy, which necessitates a great difficulty in position control. When the method wherein the light source is rotated or the method wherein the number of active light emitting points is adjusted according to an image density is adopted, a laser diode array having a plurality of light emitting points is employed. In the apparatus, narrowing the intervals between the light emitting points causes thermal crosstalk between the light emitting points and thus may result in variations in quantity of light among light beams and degradation in image. On the other hand, broadening the intervals between the light emitting points may result in too large intervals between light beams on the scanning surface; in this case, narrowing the intervals on the scanning surface by an appropriate setting of the magnification of the optical system involves an extremely small focal depth or an extremely large loss in quantity of light caused by apertures.

As a light source device for such a light beam scanning optical apparatus which simultaneously writes a plurality of lines in one scanning operation, light emitting points arranged in a line have been conventionally employed. In the case that the conventional light source device has three or more light emitting points, however, the distances from the light emitting points to the optical axis differ and the positions of the light emitting points are not equivalent optically relative to a convergent lens which shapes the light beams emitted from the light emitting points into generally parallel or convergent bundles of rays. As a result, variations occur in convergence of the light beams, e.g., in that the aberrations of the light beams emitted from the light emitting points disposed on both sides (the light emitting points positioned remotely from the optical axis) are greater than the aberration of the light beam emitted from the light emitting point disposed in the center (the light emitting point generally on the optical axis); the uniformity of image is thus impaired.

In addition, three or more light emitting points have nonequivalent positional relations to each other; accordingly, an increase in temperature of the light emitting point disposed in the center is greater than that of the light emitting points disposed on both sides, and thus variations occur in quantity of light among the light beams.

Further, as an example of a light beam scanning optical apparatus which simultaneously writes a plurality of lines in one scanning operation, in Patent Publication No. 6-48846, for example, a technique has been proposed in which the setting of the intervals between light emitting points of a light source is made flexible by performing interlaced scanning. Interlaced scanning means scanning previously the lines between the lines to be scanned afterward, as shown in FIG. 48, as distinct from scanning lines sequentially from the front extremity of an image with a plurality of light beam spots 81a to 81d as shown in FIG. 47.

The interlaced scanning will be specifically described below in detail, referring to FIG. 48: The intervals between a plurality of light beam spots 82a to 82d with respect to the direction of sub scanning on a photosensitive member are set uniformly at three times of an interval P which is required to form an image of a desired density. In a first operation of scanning, the light emitting points producing the spots 82a and 82b on the photosensitive member are not lighted, while only the light emitting points producing the spots 82c and 82d are lighted concurrently. In a second operation of scanning, only the spot 82a is not lighted, while the remaining spots 82b to 82d are lighted concurrently. In a third and later operations of scanning, all the spots 82a to 82d are lighted concurrently. In the first and second operations, some spots are not lighted for preventing a failure in scanning at the front extremity portion of an image. Thus the plurality of light beam spots 82a to 82d form the image (an electrostatic latent image) on the scanning surface, while the spots 82c and 82d write lines ahead of lines to be written by the spots 82a, 82b in later scanning.

Such a conventional light beam scanning optical apparatus, however, has a constraint of requiring uniform intervals between the beam spots 82a to 82d on the surface to be scanned, which imposes restrictions on the individual shapes and arrangement of a deflecting device, scanning optical elements and the like. In the case that a polygon mirror is employed as the deflecting device, for example, an optical system which converges light beams on the deflection surface of the polygon mirror in the direction of sub scanning may be provided to correct errors in perpendicularity of the deflection surfaces of the polygon mirror; however, uniform intervals between the beam spots on the scanning surface, as typical in the conventional light beam scanning optical apparatus, make it difficult to optimize the magnification of the optical system. Besides, uniform intervals between the beam spots with respect to the direction of main scanning on the scanning surface similarly impose restrictions on the individual shapes and arrangement of a deflecting device and scanning optical elements.

SUMMARY OF THE INVENTION

It is an object of the invention to provide a light beam scanning optical apparatus in which the image density can be switched over without employing movable parts and by which an excellent image quality is obtained.

It is another object of the invention to provide a light source device and a light beam scanning optical apparatus which can form an image with improved uniformity.

It is another object of the invention to provide a light beam scanning optical apparatus which is improved in flexibility of the setting of the intervals between light emitting points, which have no limitations on the shapes and arrangement of a deflecting device, scanning optical elements and the like, and which is capable of forming an image of high quality at high speed.

In order to achieve the above-mentioned objects, a light beam scanning optical apparatus in accordance with the invention comprises a first light source having one light emitting point, a second light source having a plurality of light emitting points, a light beam coupling device for unifying the directions of travel of light beams emitted from the first and second light sources, means for switching light emitting points which selects and lights one out of the light emitting points of the second light source to switch over the image density, a deflecting device which performs the deflection of and scanning with the light beams having outgone from the light beam coupling device, a scanning surface which is to be illuminated by the light beams, and scanning optical elements which perform linear scanning on the scanning surface, with the light beams having outgone from the deflecting device. With the above arrangement, the luminescent points are switched over and the intervals between the light beams are varied by the means for switching light emitting points without employment of movable parts.

A light source device in accordance with the invention is characterized in that light beams emitted from the light emitting points outgo from spots on given circle having its center generally on the optical axis of the exit surface of the converging lens, and in that the aberrations of the light beams having outgone from the converging lens are generally equal.

A light source device in accordance with the invention is characterized in that light beams emitted from the light emitting points outgo from spots on a given circle having its center generally on the optical axis of the exit surface of the converging lens, and in that the light beams outgoing from the converging lens have generally an equal outgoing angle with respect to the optical axis.

A light source device in accordance with the invention is characterized in that the device comprises a light source having three or more light emitting points, and a converging lens which has a shape generally symmetrical with respect to a straight line passing through the center of the light emitting pints of the light source and which shapes light beams emitted from the light emitting points, into generally parallel and/or convergent bundles of rays.

With the above arrangements, the positions of the light emitting points are made optically equivalent with respect to the converging lens, and a variation in convergence of light beams is restrained.

A light beam scanning optical apparatus in accordance with the invention comprises a light source having three or more light emitting points; a converging lens which shapes light beams emitted from the light source, into generally parallel and/or convergent bundles of rays; a deflecting device which performs the deflection of and scanning with the light beams having outgone from the converging lens; a scanning surface which is to be illuminated by the light beams; and scanning optical elements which perform linear scanning on the scanning on the scanning surface, with the light beams having outgone from the deflecting device. Besides, the light beam scanning optical apparatus are characterized in that scanning with light beams of which the number is n and which have been emitted from the light source is simultaneously performed at unequal intervals with respect to the direction of sub scanning on the scanning surface; and in that the following relational expressions hold:

$h_i \mod n \neq 0$ $h_i \mod n \neq h_j \mod n$ $(2 \leq i \leq n, 2 \leq j \leq n, i \neq j)$ wherein $h_k$ ($2 \leq k \leq n$) is the position where the kth light beam from the front extremity of an image is converged, which position is measured with respect to the position where the first light beam from the front extremity of the image is converged on the scanning surface, and which position is expressed in units of the interval between scanning lines required by a given image density on the scanning surface; and wherein mod is an operator for finding the remainder in the case that hi or $h_j$ is divided by n. Herein, the generally parallel light includes light diverging slightly.

With the above arrangement, scanning of the scanning surface, with a plurality of light beams emitted from the light source is performed without occurrence of overscanning and of failure in scanning, though the scanning with the light beams is performed simultaneously at unequal intervals with respect to the direction of sub scanning on the scanning surface.

BRIEF DESCRIPTION OF THE DRAWINGS

These and other objects and features of the present invention will become apparent from the following description with reference to the accompanying drawings, in which:

FIG. 1 is a schematic view of an embodiment of a light beam scanning optical apparatus in accordance with the invention;

FIG. 4 is an illustration which shows scanning in the case that an image of 400 dpi is formed;

FIG. 12 is an illustration which shows a first example of arrangement of light emitting points on a laser diode array shown in FIG. 11;

FIG. 13 is an illustration which shows a case that the diameter of a light beams is regulated;

FIG. 14 is an illustration which shows the positions of the beam spots on a scanning surface of light beams emitted from the light emitting points shown in FIG. 12;

FIG. 15 is a timing chart for driving the light emitting points of the laser diode array;

FIG. 27 is a front view of another type of light source;

FIG. 28 is a front view of another type of light source;

FIG. 29 is a schematic view of another embodiment of a light beam scanning optical apparatus in accordance with the invention;

FIG. 36 is a block diagram of a circuit for driving the laser diode array;

FIG. 42 is a schematic view of another embodiment of a light beam scanning optical apparatus in accordance with the invention;

FIG. 43 is a side view of a light source unit shown in FIG. 42;

FIG. 48 is an illustration which shows interlaced scanning operations performed by a light beam scanning optical apparatus.

DETAILED DESCRIPTION OF THE PREFERRED EMBODIMENTS

Figure 2:
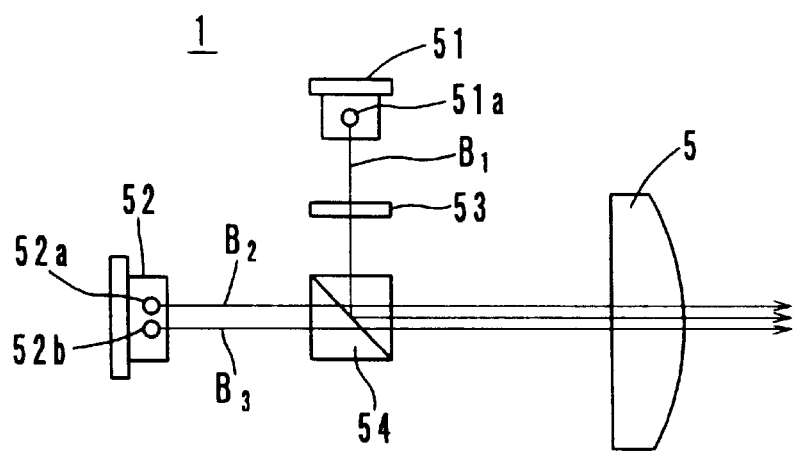
FIG. 2 is a side view of a light source unit shown in FIG. 1.

Hereinafter, some embodiments of light beam scanning optical apparatus in accordance with the invention will be described referring to the appended drawings. In the following embodiments, the same components and the same parts will be designated by the same numerals.

In FIG. 1, a light beam scanning optical apparatus generally comprise a light source unit 1, a cylindrical lens 11, a polygon mirror 12, three fθ-lenses 13, 14, 15, a cylindrical lens 16, a plane mirror 17, and a photosensitive drum 25.

As shown in FIG. 2, the light source unit 1 comprises a laser diode 51 having one light emitting point 51a, a laser diode array 52 having two light emitting points 52a and 52b, a polarizing element 53, a beam coupling device 54 and a collimator lens 5. The laser diode 51 and the laser diode array 52 are disposed so that the polarization direction of a light beam $B_1$ which has been emitted from the laser diode 51 and has outgone from the beam coupling device 54 is orthogonal to the polarization direction of light beams $B_2$ and $B_3$ which have been emitted from the laser diode array 52 and have outgone from the beam coupling device 54. In this embodiment, the laser diode 51 and the laser diode array 52 are disposed so that the direction in which the light beam $B_1$ is emitted and the direction in which the light beams $B_2$ and $B_3$ are emitted are orthogonal to each other.

The polarization direction of the light beam $B_1$ emitted from the light emitting point 51a is rotated by 90 degrees by the polarizing element 53 such as a half-wave plate, and then the beam $B_1$ is guided to the beam coupling device 54. The beam coupling device 54 is a polarizing beam splitter; that is, the device 54 comprises two prisms joined through a filter film which has a polarization characteristic. The polarized light beam $B_1$ is reflected by the filter film at a right angle and is shaped into a parallel (or convergent) bundle of rays by the collimator lens 5. The light beams $B_2$ and $B_3$ emitted from the light emitting points 52a, 52b pass through the filter film in the beam coupling device 54 and travel straight. Then, the beams $B_2$ and $B_3$ are shaped into a parallel (or convergent) bundle of rays by the collimator lens 5.

The polarization characteristic of the filter film in the beam coupling device 54 will be described below.

In this embodiment, the beam coupling device 54 is provided with a filter film which transmits light beams having a linear polarization characteristic to oscillate in the direction parallel to the direction of sub scanning and which reflects light beams having a linear polarization characteristic to oscillate in the direction orthogonal to the direction of sub scanning. Thus, all the light beams $B_1$ to $B_3$ emitted from the light emitting points 51a, 52a and 52b are made into linear-polarized light beams oscillating in the direction parallel to the direction of sub scanning. With this arrangement, the light beams $B_1$ to $B_3$ emitted from the light emitting points 51a, 52a and 52b are used without loss, for forming an image. Accordingly, the voltages for driving the laser diode 51 and laser diode array 52 as the light sources can be set relatively low; this feature offers advantages in power consumption, heat production and the like.

The light beams $B_1$ to $B_3$ are coupled by the beam coupling device 54 so as to travel in the same direction while adjoining one another at unequal intervals with respect to the direction of sub scanning. At this time, the light beam $B_1$ is positioned between the light beams $B_2$ and $B_3$.

The light beams $B_1$ to $B_3$ emergent from the collimator lens 5 reach the polygon mirror 12 through the cylindrical lens 11. The cylindrical lens 11 converges the light beams $B_1$ to $B_3$ into the shapes of lines extending in the direction of main scanning, in the vicinity of a reflecting surface of the polygon mirror 12. The polygon mirror 12 is driven so as to rotate at a uniform angular speed in the direction of an arrow "a". The light beams $B_1$ to $B_3$ are deflected for scanning, at a uniform angular speed by the reflecting surfaces in response to the rotation of the polygon mirror 12. The beams $B_1$ to $B_3$ then pass through the fθ-lenses 13, 14, 15 and the cylindrical lens 16 and are reflected downward by the plane mirror 17. After that, the light beams $B_1$ to $B_3$ are focused on the photosensitive drum 25, which is scanned with the beams in the direction of an arrow "b".

The fθ-lenses 13, 14 and 15 have a function of correcting distortion, i.e., a function of correcting the main scanning speed of the light beams $B_1$ to $B_3$ deflected at the uniform angular speed by the polygon mirror 12 to a constant speed on the photosensitive drum 25. The cylindrical lens 16 has a power only in the direction of sub scanning in the same way as the cylindrical lens 11. Both the lenses 11, 16 cooperate with each other to correct errors in perpendicularity of the reflecting surface of the polygon mirror.

The photosensitive drum 25 is driven so as to rotate at a uniform speed in the direction of an arrow "c", so that an image (an electrostatic latent image) is written on the photosensitive drum 25 by main scanning performed by the polygon mirror 12 and the fθ-lenses 13, 14 and 15 in the direction of the arrow "b", and by sub scanning performed by the photosensitive drum 25 in the direction of the arrow "c".

Figure 3:
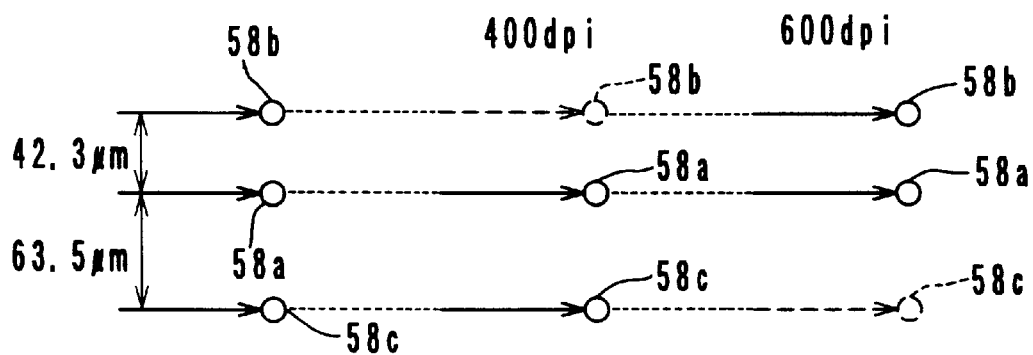
FIG. 3 is an illustration which shows the beam spots on a photosensitive drum of light beams emitted from the laser source unit of FIG. 2.

Referring to FIG. 3, a description will be provided below on the writing of an image on the photosensitive drum 25 in the case that the light source unit 1 is used as a two-beam light source unit capable of switching over the image density.

As shown in FIG. 3(A), the light beams $B_1$, $B_2$ and $B_3$ emitted from the light emitting points 51a, 52a and 52b form beam spots 58a, 58b and 58c on the photosensitive drum 25 at unequal intervals with respect to the direction of sub scanning. The spot 58a is positioned between the spots 58b and 58c on the photosensitive drum 25. The interval between the spots 58a and 58b is 42.3 μm, corresponding to the interval between light beams required by an image density of 600 dpi; the interval between the spots 58a and 58c is 63.5 μm, corresponding to the interval between light beams required by an image density of 400 dpi. When an image having the image density of 400 dpi is formed on the photosensitive drum 25, the light emitting point 51a of the laser diode 51 and the light emitting point 52b of the laser diode array 52 are lighted with the light emitting point 52a being unlighted. At this time, as shown in FIG. 3(B), the two spots 58a and 58c are formed at the interval of 63.5 μm on the photosensitive drum 25. As shown in FIG. 4, scanning lines are scanned sequentially from the front extremity of the image with the spots 58a and 58c.

When the image density is switched from 400 dpi to 600 dpi for forming an image of 600 dpi, the light emitting point 52a of the laser diode array 52 is lighted with the light emitting point 52b being unlighted. At this time, as shown in FIG. 3(C), the two spots 58a and 58b are formed at the interval of 42.3 μm on the photosensitive drum 25. With the spots 58a and 58b, scanning lines are scanned sequentially from the front extremity of the image.

Figure 5:
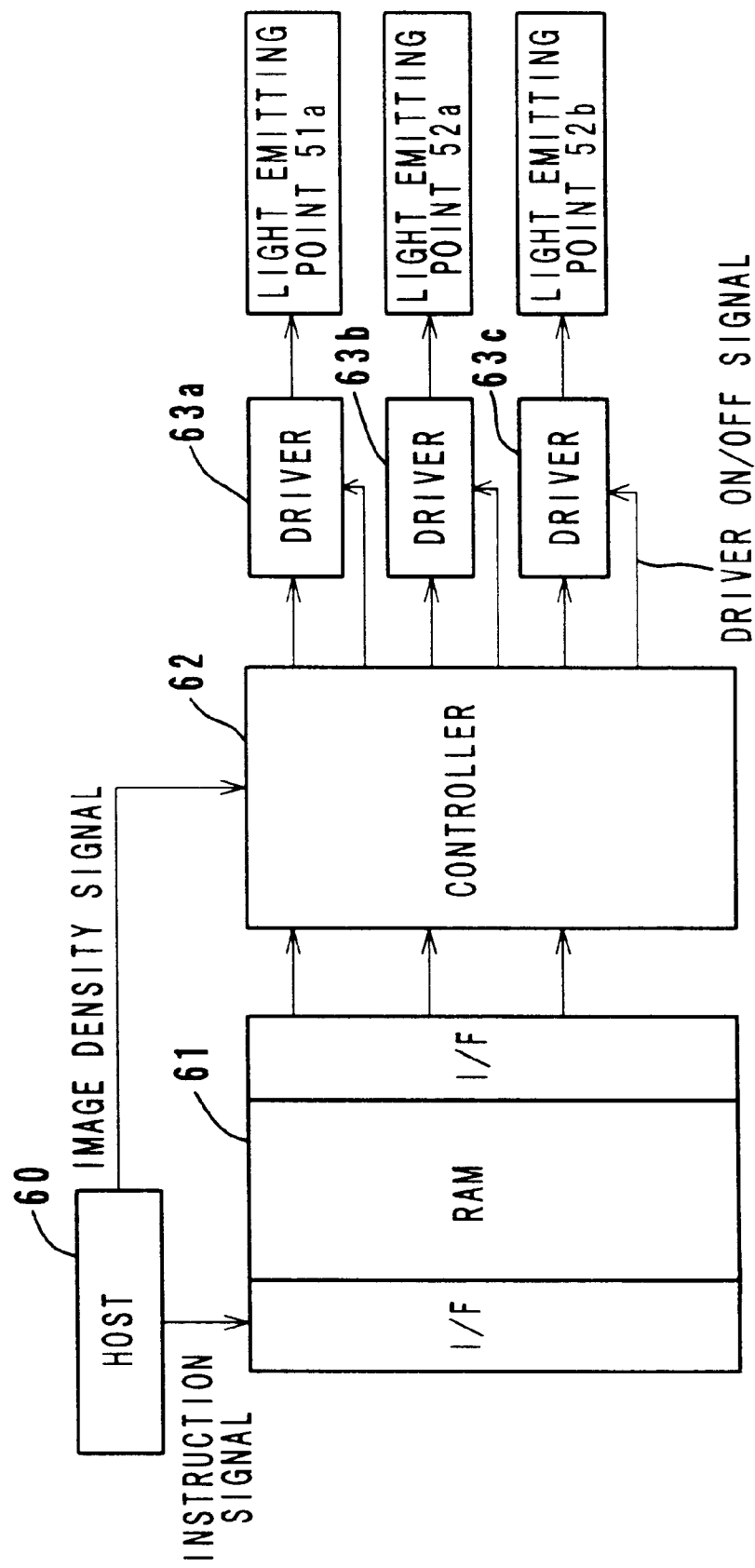
FIG. 5 is a block diagram of a circuit for driving light emitting points.
Figure 6:
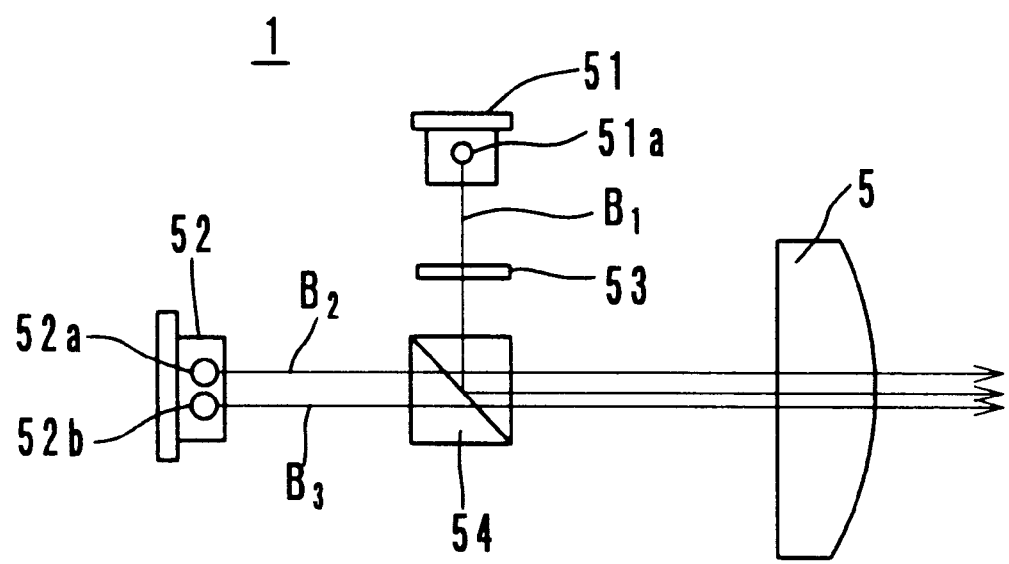
FIG. 6 is a side view of a modification of the light source unit.

As shown in FIG. 5, a circuit for driving the laser diode 51 and the laser diode array 52 generally comprises a RAM 61 for storing image data, a controller 62 for controlling the laser diode 51 and the laser diode array 52, and drivers 63a to 63c for driving the light emitting points 51a, 52a and 52b.

In the case that the light beam scanning optical apparatus of this embodiment is incorporated into, e.g., a digital copying machine, the image density achieved by the light beam scanning optical apparatus can be controlled by a signal inputted from a switch for selecting image density, which switch is provided on the control panel of the copying machine. In this arrangement, an operator selects an image of e.g., 400 dpi by the switch for selecting image density, and then an image density signal is transmitted from a host computer 60 to the controller 62. On the basis of the image density signal, the controller 62 transmits driver-ON/OFF signals to the drivers 63a to 63c to turn on the drivers 63a and 63c and to turn off the driver 63b. Subsequently, an instruction signal is inputted from the host computer 60 through an interface (I/F) into the RAM 61, and then the image data stored in the RAM 61 is sequentially extracted and transmitted to the controller 62. The controller 62 distributes the image data between the drivers 63a and 63c, which drive the light emitting points 51a and 52b, respectively.

As described above, the image density can be switched over only by the switching between the two light emitting points 52a and 52b of the laser diode array 52: that is, the image density can be readily switched over without the need to provide movable parts. Besides, the light source is constituted of two elements, i.e., the laser diode 51 and the laser diode array 52, and therefore the interval between the light emitting points 52a and 52b of the laser diode array 52 can be made larger than the interval between light emitting points in a light source constituted of a single laser diode array, so that the influence of thermal crosstalk can be reduced. Additionally, with respect to the direction of sub scanning, the beam spot 58a which is formed on the photosensitive drum 25 by the light beam $B_1$ emitted from the laser diode 51 is positioned between the beam spots 58b and 58c which are formed by the light beams $B_2$ and $B_3$ emitted from the laser diode array 52, and therefore the intervals between the light emitting points 51a, 52a and 52b can be decreased in appearance. As a result, the intervals between the light beams $B_1$ to $B_3$ on the photosensitive drum 25 can be decreased even though the interval between the light emitting points 52a and 52b is comparatively large, so that the thermal crosstalk between the light emitting points 52a and 52b can be further reduced.

Referring to FIGS. 6 to 9, a description will be provided below on the case that a light beam scanning optical apparatus which simultaneously writes three lines in one scanning operation on a photosensitive drum 25. The light source unit 1 shown in FIG. 6 forms an image of 400 dpi.

Figure 7:
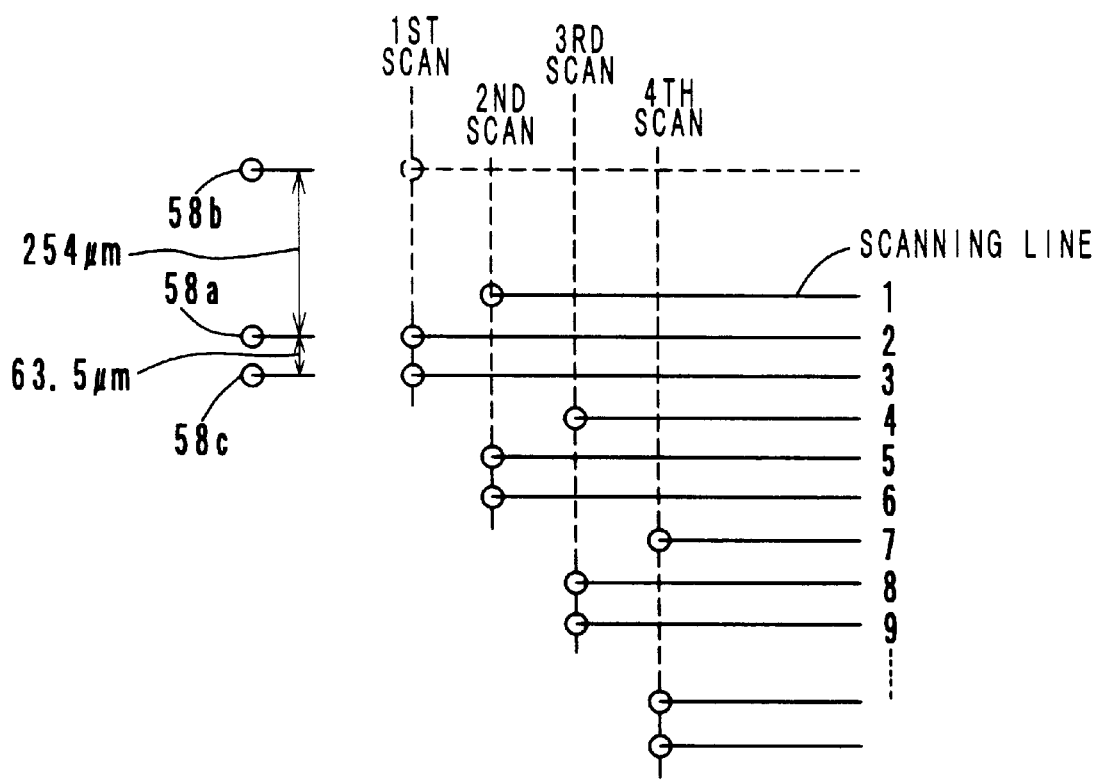
FIG. 7 is an illustration which shows scanning with light beams emitted from the light source unit shown in FIG. 6.

As shown in FIG. 7, the light beams $B_1$, $B_2$ and $B_3$ emitted from the light emitting points 51a, 52a and 52b of the laser diode 51 and the laser diode array 52 form the light beam spots 58a, 58b and 58c on the photosensitive drum 25 at unequal intervals with respect to the direction of sub scanning. The spot 58a is positioned between the other spots 58b and 58c on the photosensitive drum 25. The interval between the spots 58a and 58b is 254 μm, and the interval between the spots 58a and 58c is 63.5 μm. Interlaced scanning is performed with the light beam spots 58a to 58c as follows: In a first scanning operation, the light emitting points 51a and 52b are lighted with the light emitting point 52a being unlighted. At this time, the light emitting point 51a is driven on the basis of the image data of a scanning line 2, and the light emitting point 52b is driven on the basis of the image data of a scanning line 3 (see FIG. 8). The light emitting point 52a is unlighted for preventing a failure in scanning at the front extremity portion of the image.

In a second scanning operation, all the light emitting points 51a, 52a and 52b are lighted. At this time, the light emitting point 52a is driven on the basis of the image data of a scanning line 1, the light emitting point 51a is driven on the basis of the image data of a scanning line 5, and the light emitting point 52b is driven on the basis of the image data of a scanning line 6 (see FIG. 8). After that, third, fourth and the following scanning operations continue. Thus, the three light beam spots 58a to 58c form an image on the photosensitive drum 25, while the spots 58a and 58c write on scanning lines ahead of a scanning line to be written by the spot 58b in the laser scanning operation.

Figure 8:
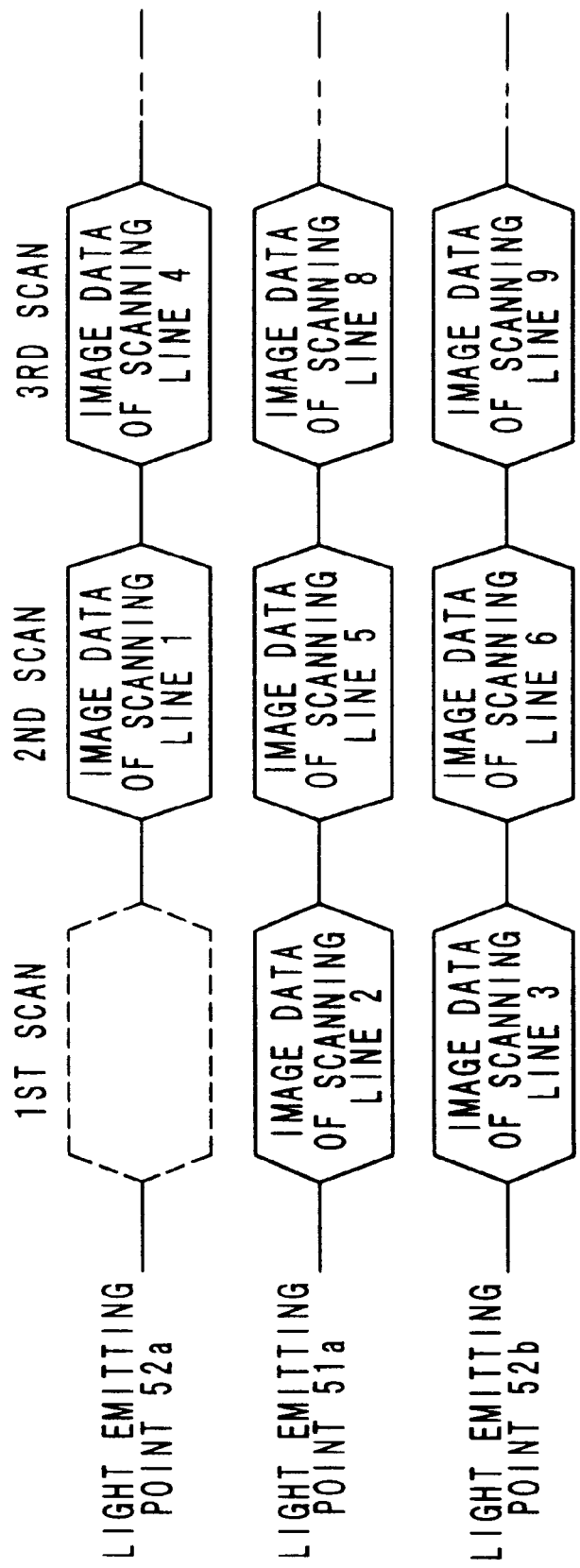
FIG. 8 is an illustration which shows image data which is transmitted to the light emitting points.

Such a process of rearranging image data as shown in FIG. 8 is performed by a host computer (see FIG. 5) as follows: An instruction signal for rearranging image data is inputted from a host computer 60 through an interface (I/F) into a RAM 61. Image data which has been arranged in numerical order starting from the scanning line 1 and which has been stored in the RAM 61 is extracted in a sequence shown in FIG. 8 in each scanning operation and is transmitted to the light emitting points 51a, 52a and 52b through a controller 62 and drivers 63a to 63c.

The light source unit 1 is constituted of two elements, i.e., the laser diode 51 and the laser diode array 52, and therefore the interval between the light emitting points 52a and 52b of the laser diode array 52 can be made larger than the interval between light emitting points in a light source constituted of a single laser diode array, so that the influence of thermal crosstalk can be reduced. Additionally, with respect to the direction of sub scanning, the beam spot 58a which is formed on the photosensitive drum 25 by the light beam $B_1$ emitted from the laser diode 51 is positioned between the beam spots 58b and 58c which are formed by the light beams $B_2$ and $B_3$ emitted from the laser diode array 52, and therefore the intervals between the light emitting points 51a, 52a and 52b can be decreased in appearance. As a result, the intervals between the light beams $B_1$ to $B_3$ on the photosensitive drum 25 can be decreased even though the interval between the light emitting points 52a and 52b is comparatively large, so that the thermal crosstalk between the light emitting points 52a and 52b can be further reduced.

Figure 9:
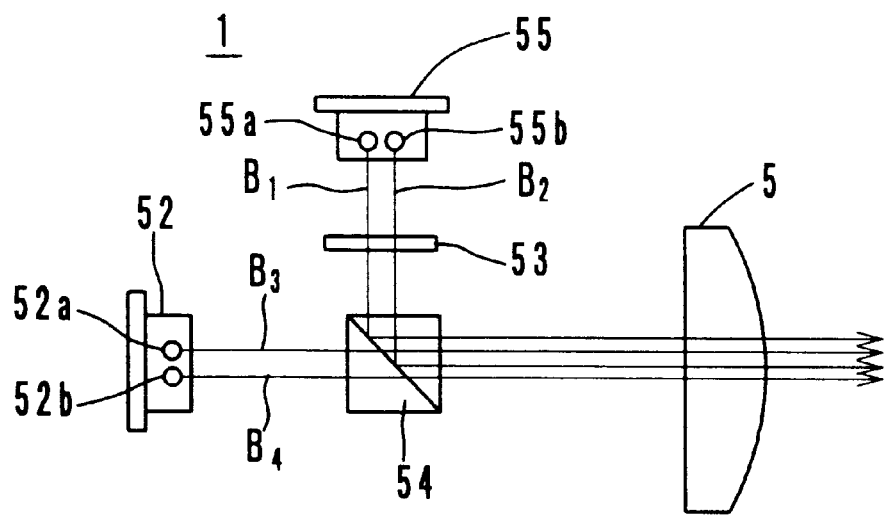
FIG. 9 is a side view of another modification of the light source unit.
Figure 10:
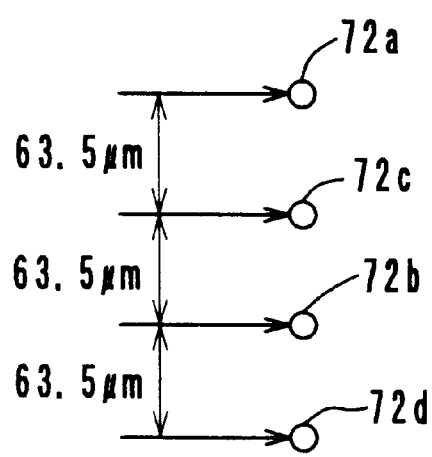
FIG. 10 is an illustration which shows the intervals on a photosensitive drum between light beams emitted from the light source unit shown in FIG. 9.

Referring to FIGS. 9 and 10, a description will be provided below on the case that a light beam scanning optical apparatus which simultaneously writes four lines in one scanning operation on a photosensitive drum 25. The light source unit 1 shown in FIG. 9 forms an image of 400 dpi.

As shown in FIG. 9, laser diode arrays 52 and 55 are disposed so that the direction in which light beams $B_1$ and $B_2$ are emitted from light emitting points 55a and 55b, respectively, is orthogonal to the direction in which light beams $B_3$ and $B_4$ are emitted from light emitting points 52a and 52b, respectively. The light beam $B_2$ emergent from a beam coupling device 54 is positioned between the light beams $B_3$ and $B_4$. As shown in FIG. 10, the light beams $B_1$, $B_2$, $B_3$ and $B_4$ form light beam spots 72a, 72b, 72c and 72d on a photosensitive drum 25 at uniform intervals with respect to the direction of sub scanning. On the photosensitive drum 25, the spot 72b is positioned between the spots 72c and 72d. The intervals between the spots 72a to 72d are 63.5 μm.

The light source is constituted of two elements, i.e., the laser diode arrays 52 and 55, and therefore the intervals between the four light emitting points 52a to 55b can be made larger than the intervals between light emitting points in a light source constituted of a single laser diode array, so that the influence of thermal crosstalk can be reduced. Additionally, with respect to the direction of sub scanning, the beam spot 72b which is formed on the photosensitive drum 25 by the light beam $B_2$ emitted from the laser diode array 55 is positioned between the beam spots 72c and 72d which are formed by the light beams $B_3$ and $B_4$ emitted from the laser diode array 52, and therefore the intervals between the light emitting points 52a, 52b, 55a and 55b can be decreased in appearance. As a result, the intervals between the light beams $B_1$ to $B_4$ on the photosensitive drum 25 can be decreased even though the intervals between the luminescent points 52a and 52b and between the luminescent points 55a and 55b are comparatively large, so that the thermal crosstalk between the light emitting points 52a and 52b and between the light emitting points 55a and 55b can be further reduced.

Figure 11:
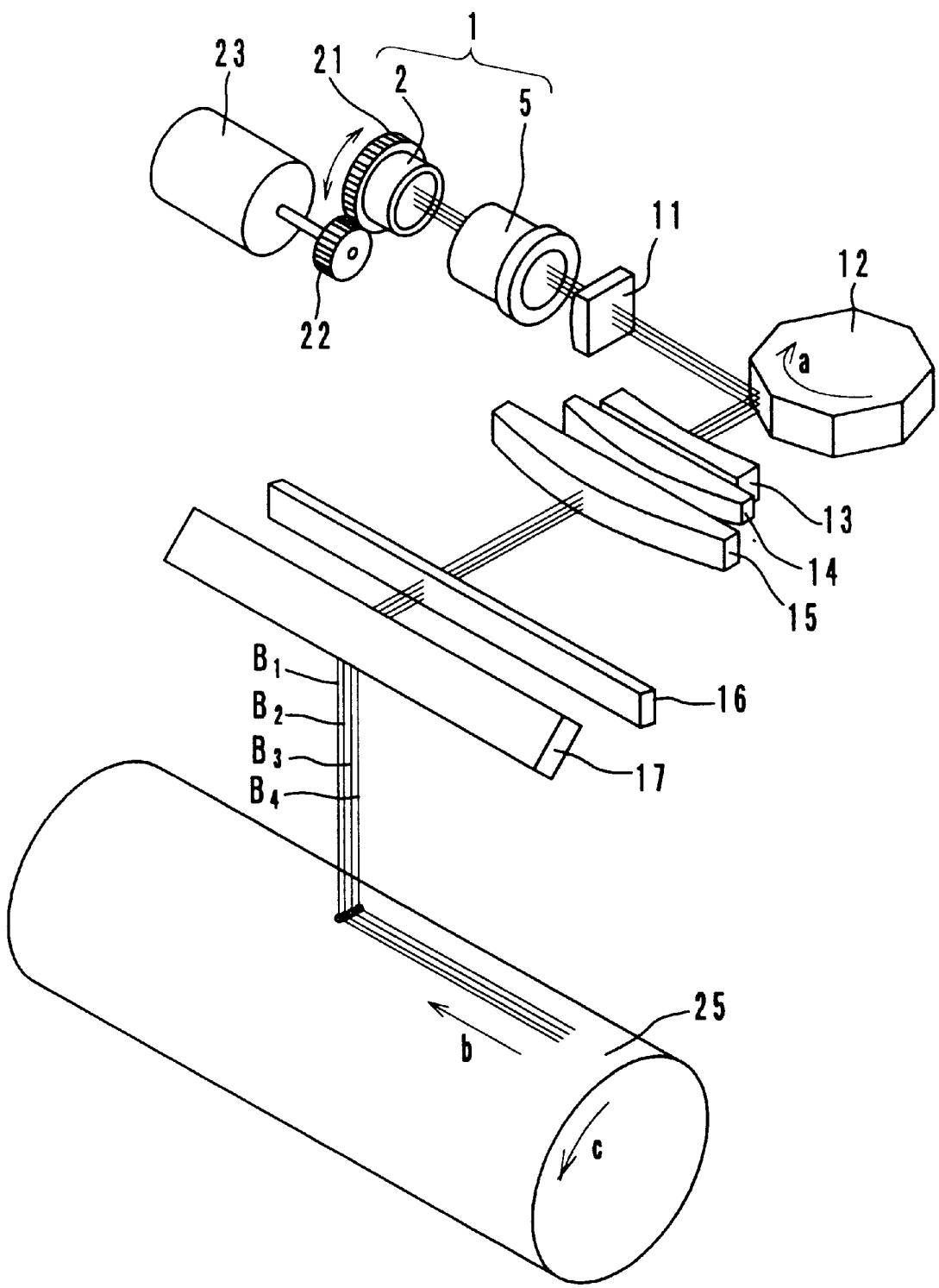
FIG. 11 is a schematic view of another embodiment of a light beam scanning optical apparatus accordance with the invention.

In FIG. 11, light beam scanning optical apparatus generally comprise a light source unit 1, a cylindrical lens 11, a polygon mirror 12, three fθ-lenses 13, 14, 15, a cylindrical lens 16, a plane mirror 17, and a photosensitive drum 25.

The light source unit 1 comprises a laser diode array 2 and a collimator lens 5. The collimator lens 5 has a shape symmetrical with respect to its axis, which is positioned on the optical axis C of the scanning optical apparatus.

The laser diode array 2 has a generally cylindrical shape, and as shown in FIG. 12, has four light emitting points 2a, 2b, 2c and 2d disposed on its peripheral portion at uniform intervals of 90 degrees. Accordingly, the positional relations between the light emitting points 2a to 2d are equivalent, and variations in temperature increase among the light emitting points 2a through 2d can be reduced. As a result, variations in quantity of light among light beams emitted from the light emitting points 2a through 2d are reduced. Besides, the light emitting points 2a to 2d are disposed on the circumference Q of a circle having its center on the axis of symmetry (the optical axis C) of the collimator lens 5. This arrangement makes the positions of the light emitting points 2a to 2d optically equivalent with respect to the collimator lens 5. Consequently, variations in convergence among the light beams emitted from the light emitting points 2a through 2d is restrained, so that the uniformity of image is improved.

As shown in FIG. 11, an output pinion 22 of a stepping motor 23 is in mesh with a rack 21 formed on the outer circumferential surface of the laser diode array 2. The laser diode array 2 can be rotated on the optical axis C in the directions along its outer circumference by the operation of the stepping motor 23 in forward or reverse direction. This rotation moves the four light emitting points 2a to 2d around the optical axis C so that the positions where light beams emitted from the light emitting points 2a to 2d are converged on the photosensitive drum 25 are adjusted and so that the image density is switched over.

Light beams $B_1$, $B_2$, $B_3$ and $B_4$ emitted from the laser diode array 2 are shaped into parallel (or convergent) bundles of rays by the collimator lens 5. The light beams $B_1$ to $B_4$ are emergent from the collimator lens 5 at spots on a circle having its center on the optical axis C. The aberrations of the light beams $B_1$ to $B_4$ emergent from the collimator lens 5 are generally equal, and because the light emitting points 2a to 2d of the light beams $B_1$ to $B_4$ are at the positions which are optically equivalent with respect to the optical surface of the collimator lens 5 as described above, the aberrations caused on the optical surface of the collimator lens 5 are the same. As a result, an image having an advantage in uniformity can be obtained. The light beams $B_1$ to $B_4$ are emergent from the collimator lens 5 at uniform angles to the optical axis C. In the case that an aperture 7 is disposed at the back focal point of the collimator lens 5 on the optical axis C in order to regulate the diameters of the light beams $B_1$ to $B_4$, e.g., as shown in FIG. 13, the light beams $B_1$ to $B_4$ undergo the same quantity of eclipse at all time by the aperture 7, and an image having an advantage in uniformity can be obtained. These effects remain invariant even though the light emitting points 2a to 2d are repositioned by the rotation of the laser diode array 2 in the circumferential direction with use of the stepping motor 23.

The light beams $B_1$ to $B_4$ emergent from the collimator lens 5 reach the polygon mirror 12 through the cylindrical lens 11. The cylindrical lens 11 converges the light beams $B_1$ to $B_4$ into the shapes of lines extending in the direction of main scanning, in the vicinity of a reflecting surface of the polygon mirror 12. The polygon mirror 12 is driven so as to rotate at a uniform angular speed in the direction of an arrow "a". The light beams $B_1$ to $B_4$ are deflected for scanning, at a uniform angular speed by the reflecting surfaces in response to the rotation of the polygon mirror 12. The beams $B_1$ to $B_4$ then pass through the fθ-lenses 13, 14, 15 and the cylindrical lens 16 and are reflected downward by the plane mirror 17. After that, the light beams $B_1$ to $B_4$ are focused on the photosensitive drum 25, which is scanned with the beams in the direction of an arrow "b". Thus, four lines are simultaneously written in one scanning operation in this optical system.

The fθ-lenses 13, 14 and 15 have a function of correcting distortion, i.e., a function of correcting the main scanning speed of the light beams $B_1$ to $B_4$ deflected at the uniform angular speed by the polygon mirror 12 to a constant speed in the photosensitive drum 25. The cylindrical lens 16 has a power only in the direction of sub scanning in the same way as the cylindrical lens 11. Both the lenses 11, 16 cooperate with each other to correct errors in perpendicularity of the reflecting surfaces of the polygon mirror.

The photosensitive drum 25 is driven so as to rotate at a uniform speed in the direction of an arrow "c", so that an image (an electrostatic latent image) is written on the photosensitive drum 25 by main scanning performed by the polygon mirror 12 and the fθ-lenses 13, 14 and 15 in the direction of the arrow "b", and by sub scanning performed by the photosensitive drum 25 in the direction of the arrow "c".

Referring to FIGS. 12, 14 and 15, there will be described below a first example of adjustment of the positions where the four light beams $B_1$ to $B_4$ emitted from the laser diode array 2 are focused on the photosensitive drum 25 in the case that the image density achieved by the light beam scanning optical apparatus is set at 400 dpi.

As shown in FIG. 12, the laser diode array 2 is rotated in its circumferential direction with use of the stepping motor 23 until the line linking the light emitting point 2a and the optical axis C forms an angle of 78.7 degrees to the direction of main scanning. As a result, the light emitting points 2a to 2d appear to be disposed at unequal intervals with respect to the direction of sub scanning, and as shown in FIG. 14, the light beams $B_1$ to $B_4$ emitted from the light emitting points 2a to 2d are focused on the photosensitive drum 25 at unequal intervals with respect to the direction of sub scanning.

In this case, as to the intervals between light beam spots 30a to 30d of the light beams $B_1$ to $B_4$ on the photosensitive drum 25 with respect to the direction of sub scanning, the interval between the spots 30a and 30d and the interval between the spots 30b and 30c are represented as "2" and the interval between the spots 30d and 30b is represented as "1" providing the interval p(=63.4 μm (approximately 63.5 μm), corresponding to 400 dpi) between light beams required by an image density of 400 dpi is given as "1".

In the laser diode array 2, the light emitting points 2a to 2d have different positions with respect to the direction of main scanning. Accordingly, the starting positions in a writing operation performed by the light emitting points 2a to 2d shift from one another with respect to the direction of main scanning, when light beams $B_1$ to $B_4$ are simultaneously emitted from the light emitting points 2a to 2d. In order to align the starting positions in a writing operation performed by the light emitting points 2a to 2d, the starts of the driving of the light emitting points 2a, 2c and 2d have to be delayed relative to the start of the driving of the light emitting point 2b. More specifically, as shown in FIG. 15, the driving of the referential light emitting point 2b is started on the basis of image data after the lapse of a time to since a vertical synchronizing signal for determining a starting position in printing is detected in each scanning operation. The driving of the light emitting points 2a, 2c and 2d is started on the basis of image data after the subsequent lapse of delay times $t_1$, $t_2$ and $t_3$, respectively. Thus, in the light beam scanning optical apparatus, the starting positions in writing are aligned.

Figure 16:
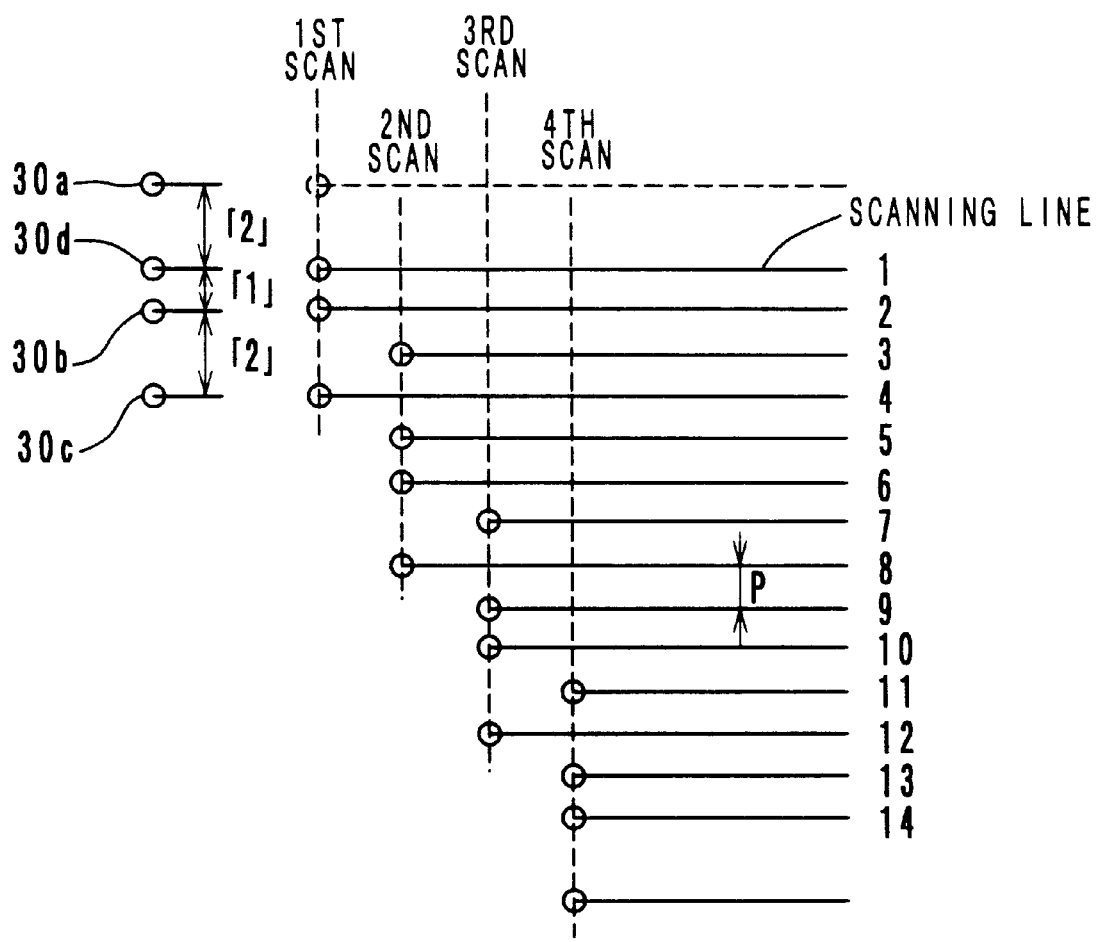
FIG. 16 is an illustration which shows scanning with the light beam spots shown in FIG. 14.
Figure 17:
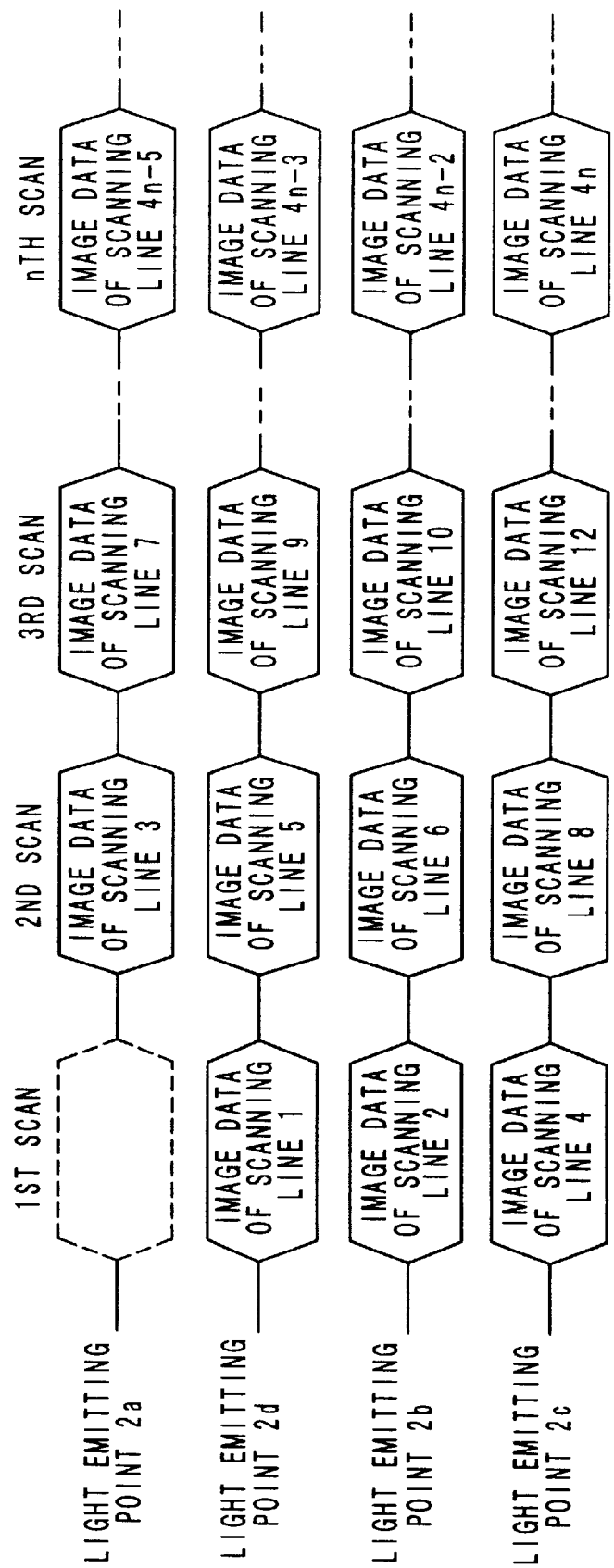
FIG. 17 is an illustration which shows image data which is transmitted to the light emitting points of the laser diode array.

Referring to FIGS. 16 and 17, the writing of an image on the photosensitive drum 25 by the laser diode array 2 set as described above will be described below.

As shown in FIG. 16, the light beams $B_1$ to $B_4$ emitted from the light emitting points 2a to 2d form the beam spots 30a to 30d on the photosensitive drum 25 at unequal intervals with respect to the direction of sub scanning. Interlaced scanning is performed with the beam spots 30a to 30d as follows: In a first scanning operation, the light emitting points 2b to 2d are lighted with the light emitting point 2a being unlighted. At this time, the light emitting point 2d is driven on the basis of the image data of a scanning line 1, the light emitting point 2b is driven on the basis of the image data of a scanning line 2, and the light emitting point 2c is driven on the basis of the image data of a scanning line 4 (see FIG. 17). The light emitting point 2a is unlighted for preventing a failure in scanning at the front extremity portion of the image.

In a second scanning operation, all the light emitting points 2a to 2d are lighted. At this time, the light emitting point 2a is driven on the basis of the image data of a scanning line 3, the light emitting point 2d is driven on the basis of the image data of a scanning line 5, the light emitting point 2b is driven on the basis of the image data of a scanning line 6, and the light emitting point 2c is driven on the basis of the image data of a scanning line 8 (see FIG. 17). After that, third, fourth and the following scanning operations continue.

Thus, the four light beam spots 30a to 30d form an image on the photosensitive drum 25, while the spot 30c writes on a scanning line ahead of a scanning line to be written by the spot 30a in the later scanning operation. Consequently, the image can be formed on the photosensitive drum 25 without occurrence of overwrite and of a failure in scanning, though the light beam spots 30a to 30d are arranged at unequal intervals with respect to the direction of sub scanning. With the arrangement in which the light beam spots 30a to 30d on the photosensitive drum 25 are positioned at unequal intervals with respect to the direction of sub scanning, the setting of the intervals between the light emitting points 2a to 2d becomes more flexible, and the shapes and arrangement of the polygon mirror 12, the fθ-lenses 13 to 15, and the like can be optimized without restrain.

Figure 18:
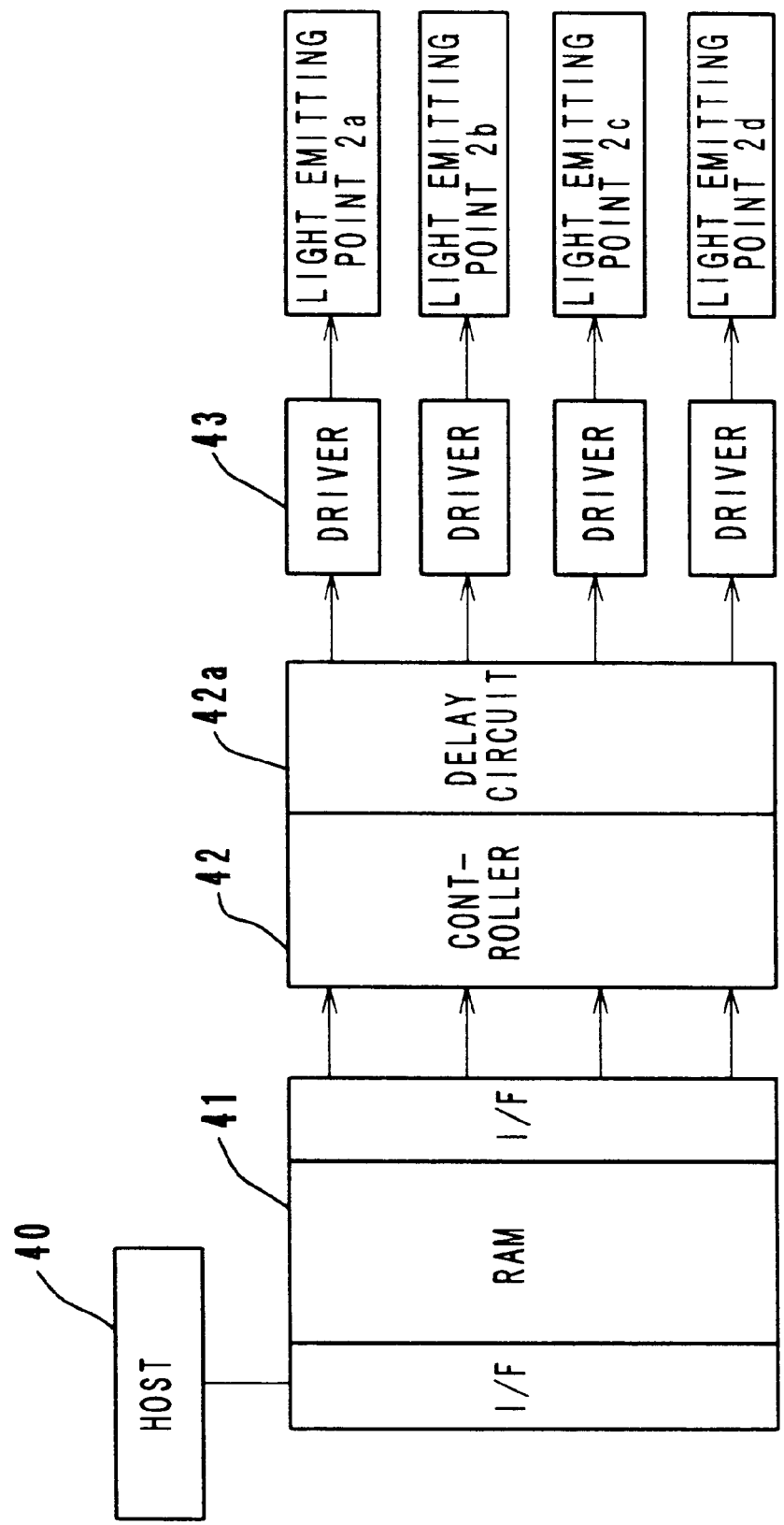
FIG. 18 is a block diagram of a circuit for driving the laser diode array.

As shown in FIG. 18, a circuit for driving the laser diode array 2 generally comprises a RAM 41 for storing image data, a controller 42 for controlling the laser diode array 2, and drivers 43 for driving the light emitting points 2a to 2d. When an instruction signal for rearranging image data is inputted from a host computer 40 through an interface (I/F) into the RAM 41, image data which has been arranged in numerical order starting from the scanning line 1 and has been stored in the RAM 41 is taken and transmitted to the controller 42 in a sequence shown in FIG. 16 in each scanning operation. The controller 42 outputs image data for each scanning line after the lapse of a predetermined delay time with use of a delay circuit 42a. The image data signals outputted from the controller 42 sequentially with delays are respectively transmitted to the drivers 43, which sequentially drive the corresponding light emitting points 2a to 2d.

Referring to FIGS. 19 to 22, there will be described below a second example of the adjustment of the positions where the four light beams $B_1$ to $B_4$ are focused on the photosensitive drum 25 in the case that the image density achieved by the light beam scanning optical apparatus is switched to 600 dpi.

Figure 19:
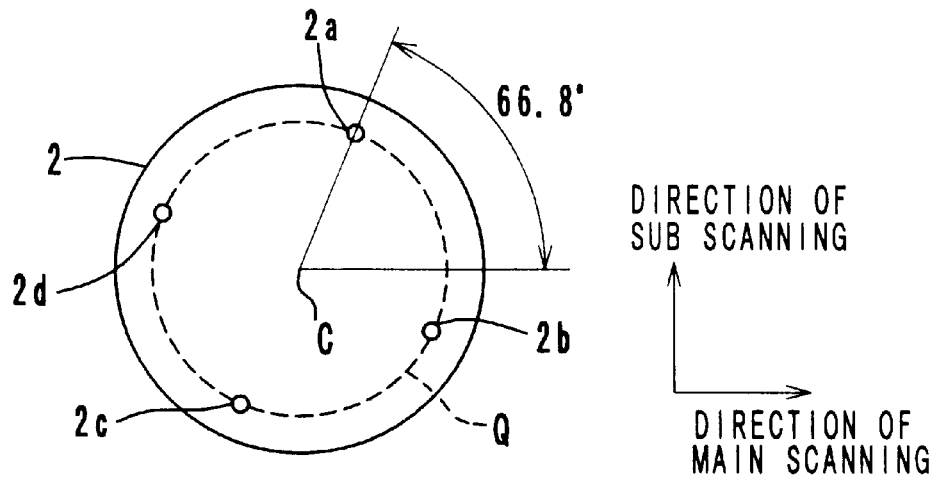
FIG. 19 is an illustration which shows a second example of arrangement of light emitting points on the laser diode array shown in FIG. 11.
Figure 20:
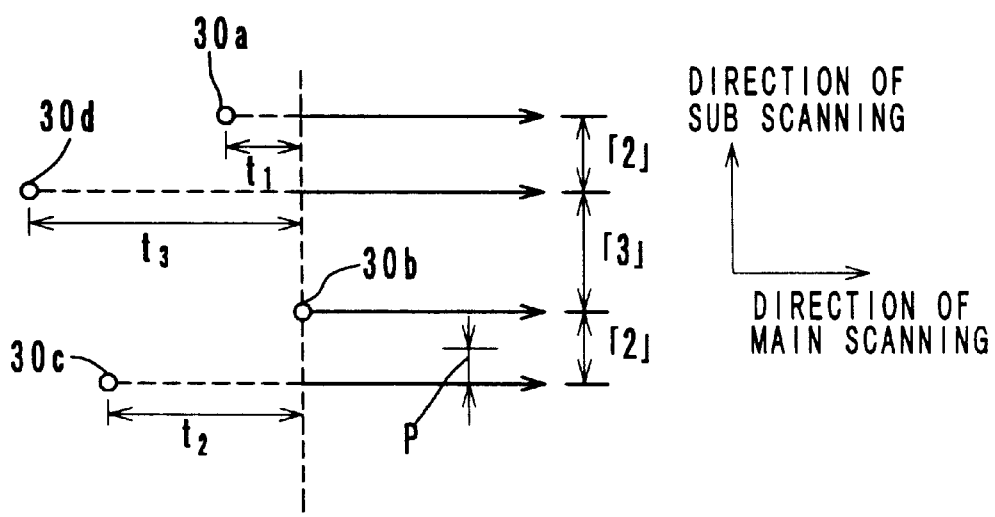
FIG. 20 is an illustration which shows the positions of the beam spots on a scanning surface of light beams emitted from the light emitting points shown in FIG. 19.

As shown in FIG. 19, the laser diode array 2 is rotated in its circumferential direction with use of the stepping motor 23 until the line linking the light emitting point 2a and the optical axis C forms an angle of 66.8 degrees to the direction of main scanning. As a result, the light emitting points 2a to 2d appear to be disposed at unequal intervals with respect to the direction of sub scanning, and as shown in FIG. 20, the light beams $B_1$ to $B_4$ emitted from the light emitting points 2a to 2d form light beam spots 30a to 30d on the photosensitive drum 25 at unequal intervals with respect to the direction of sub scanning. As for the intervals between the spots 30a to 30d, the interval between the spots 30a and 30d and the interval between the spots 30b and 30c are represented as "2", and the interval between the spots 30d and 30b is represented as "3", providing the interval p(=42.4 μm (approximately 42.3 μm), corresponding to 600 dpi) between light beams required by the image density of 600 dpi is given as "1".

Figure 21:
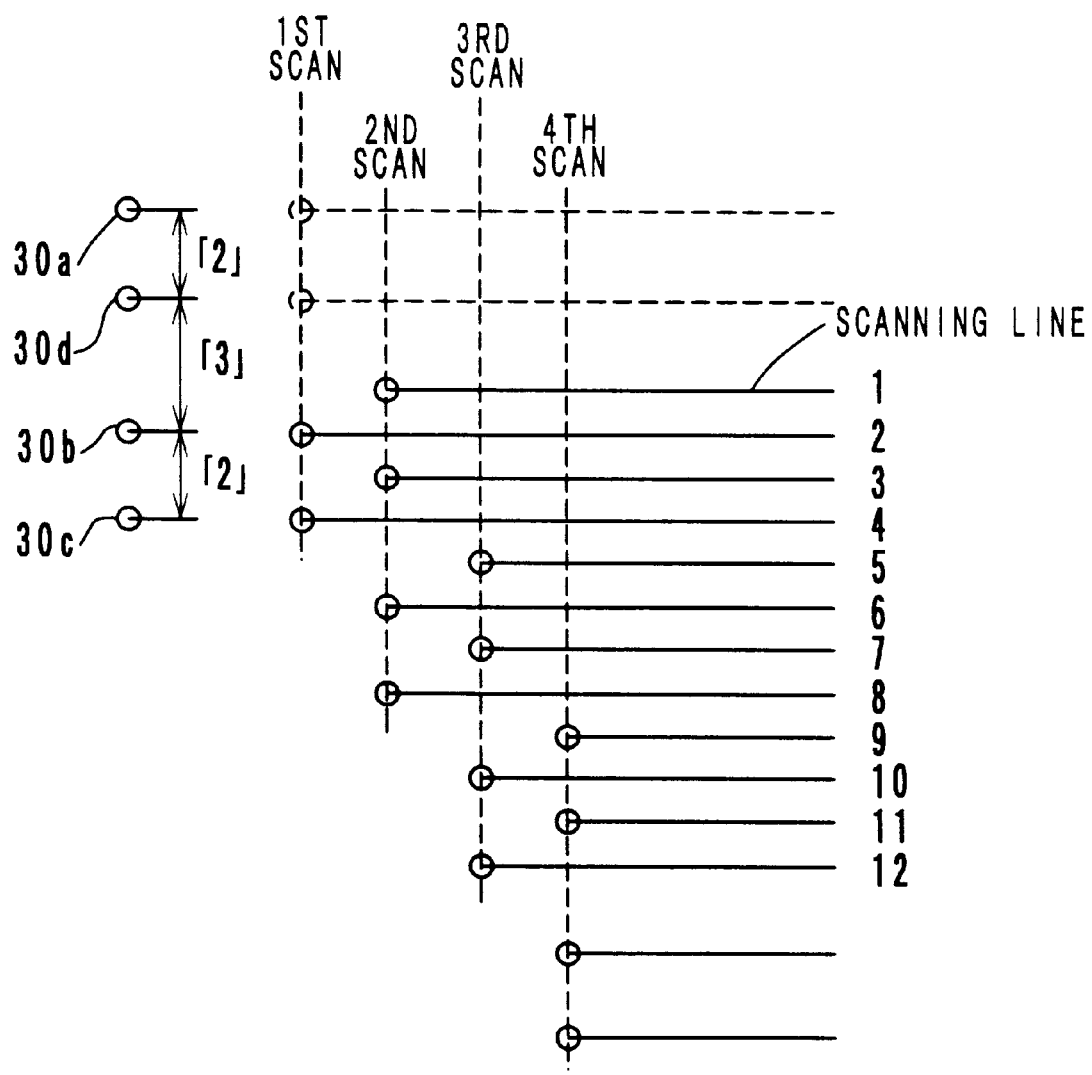
FIG. 21 is an illustration which shows scanning with the light beam spots shown in FIG. 20.
Figure 22:
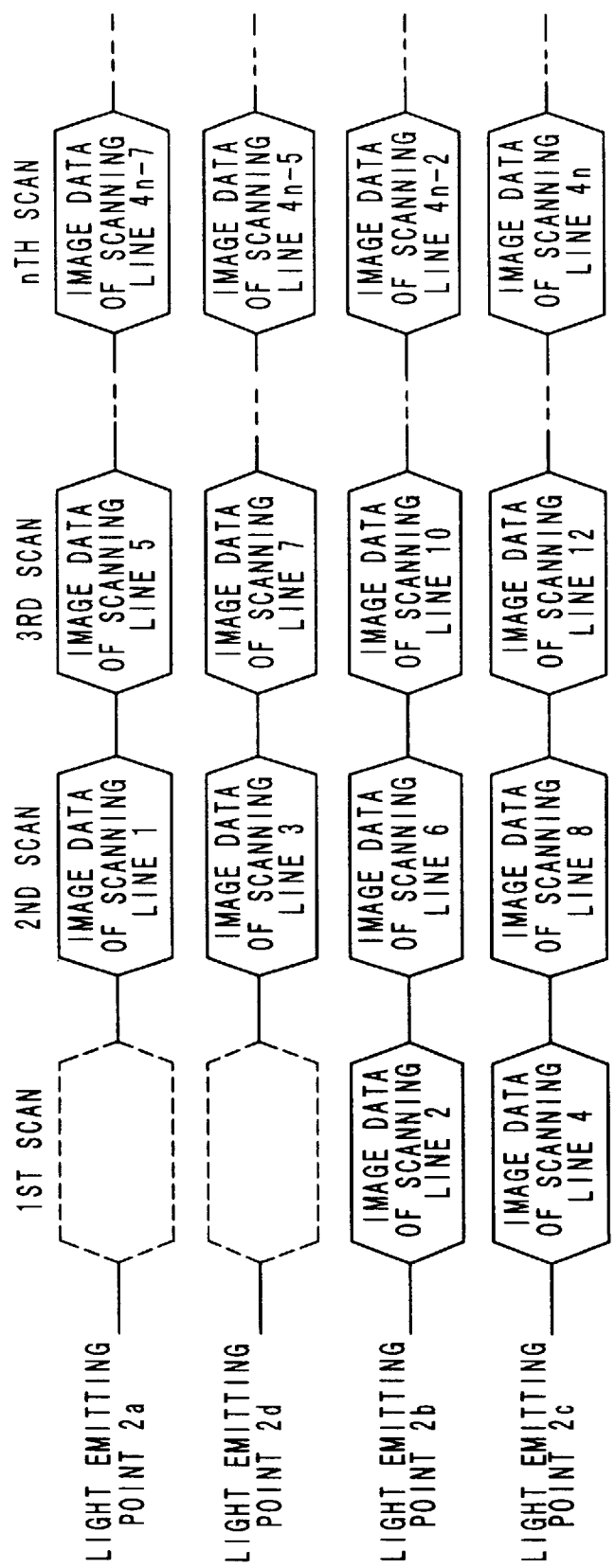
FIG. 22 is an illustration which shows image data which is transmitted to the light emitting points of the laser diode array.

Referring to FIG. 21, the writing of an image on the photosensitive drum 25 by the laser diode array 2 set as described above will be described below.

In a first scanning operation, the light emitting points 2b and 2c are lighted with the light emitting point 2a and 2d being unlighted. At this time, the light emitting point 2b is driven on the basis of the image data of a scanning line 2, and the light emitting point 2c is driven on the basis of the image data of a scanning line 4 (see FIG. 22). In a second scanning operation, all the light emitting points 2a to 2d are lighted. At this time, the light emitting point 2a is driven on the basis of the image data of a scanning line 1, the light emitting point 2b is driven on the basis of the image data of a scanning line 6, the light emitting point 2c is driven on the basis of the image data of a scanning line 8, and the light emitting point 2d is driven on the basis of the image data of a scanning line 3 (see FIG. 22). Such a rearranging process on image data is performed according to the instruction signal from the host computer 40 shown in FIG. 18, as described above. Thus the image is formed on the photosensitive drum 25 by interlaced scanning with the four light beam spots 30a to 30d.

Figure 23:
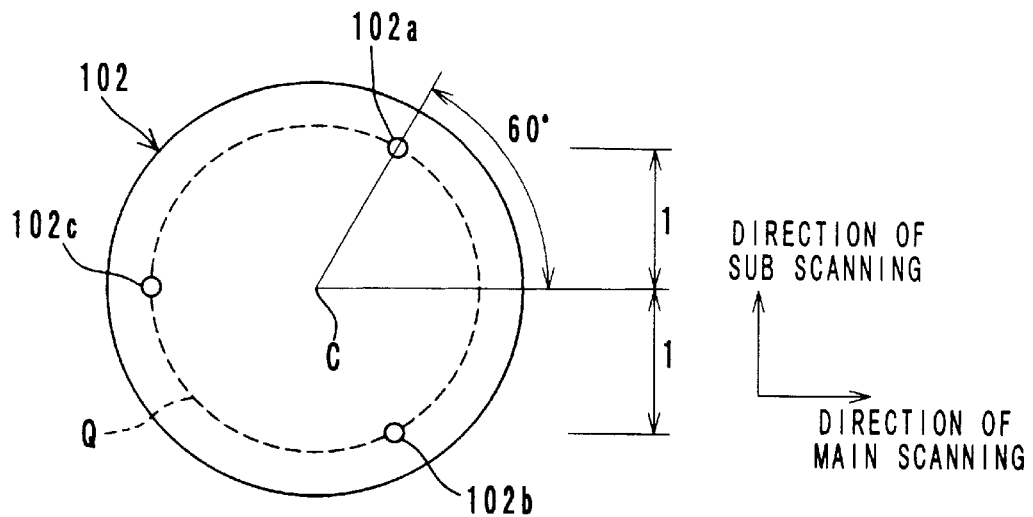
FIG. 23 is an illustration which shows arrangement of light emitting points in another laser diode array.
Figure 24:
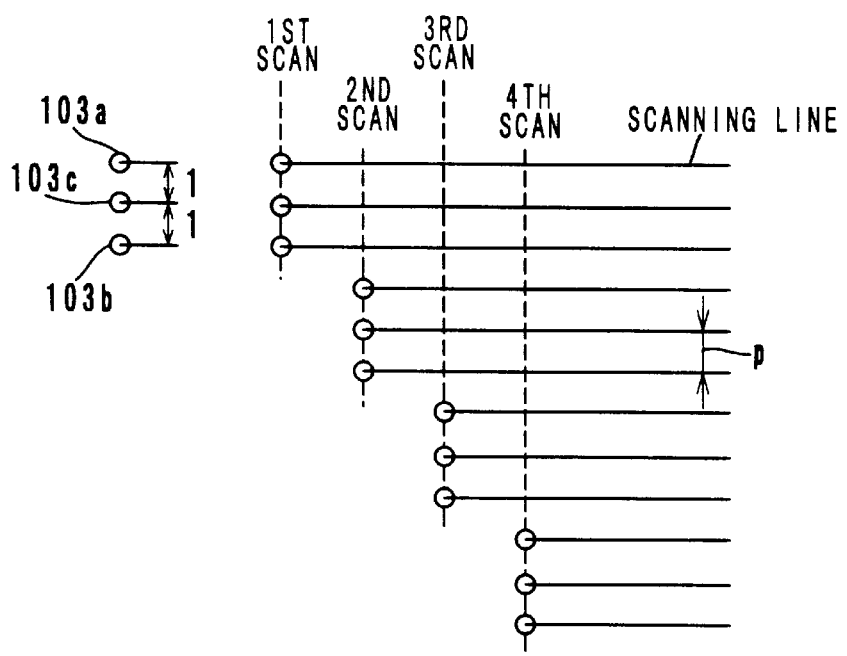
FIG. 24 is an illustration which shows scanning with the laser diode array shown in FIG. 23.

As shown in FIG. 23, the following is a description on a light source device employing a laser diode array 102 which has three light emitting points 102a, 102b and 102c disposed on its peripheral portion at uniform intervals of 120 degrees. The light emitting points 102a to 102c are disposed on the circumference Q of a circle having its center on the optical axis C. The positions of the light emitting points 102a to 102c are established so that the line linking the light emitting point 102a and the optical axis C forms an angle of 60 degrees to the direction of main scanning. As a result, the light emitting points 102a to 102c appear to be disposed at uniform intervals with respect to the direction of sub scanning, and as shown in FIG. 24, light beams $B_1$, $B_2$ and $B_3$ emitted from the light emitting points 102a, 102b and 102c form light beam spots 103a, 103b and 103c on a photosensitive drum 25 at uniform intervals with respect to the direction of sub scanning. As for the intervals between the spots 103a to 103c, the intervals between the spots 103a and 103c and between the spots 103c and 103b are represented as "1", providing the interval p between light beams required by a desired image density is given as "1". The image is formed on the photosensitive drum 25 by scanning sequentially from the front extremity of the image while simultaneously writing three lines in one scanning operation with the light beam spots 103a to 103c.

Figure 25:
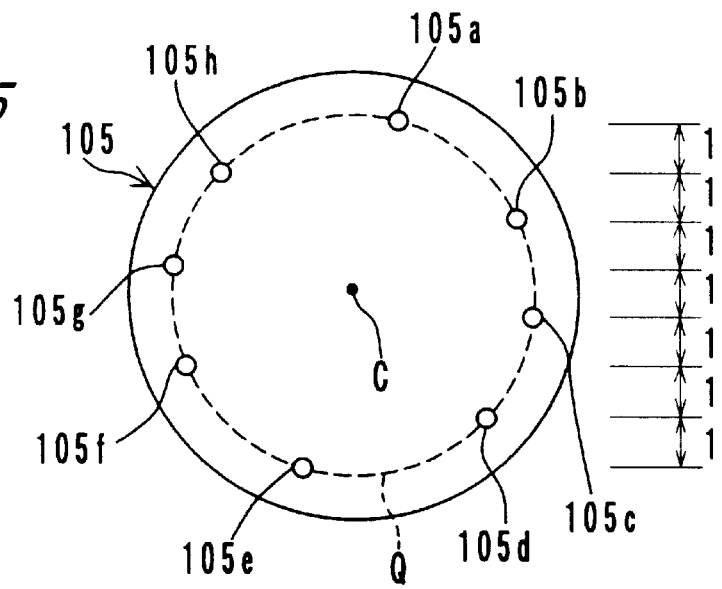
FIG. 25 is an illustration which shows arrangement of light emitting points in another laser diode array.
Figure 26:
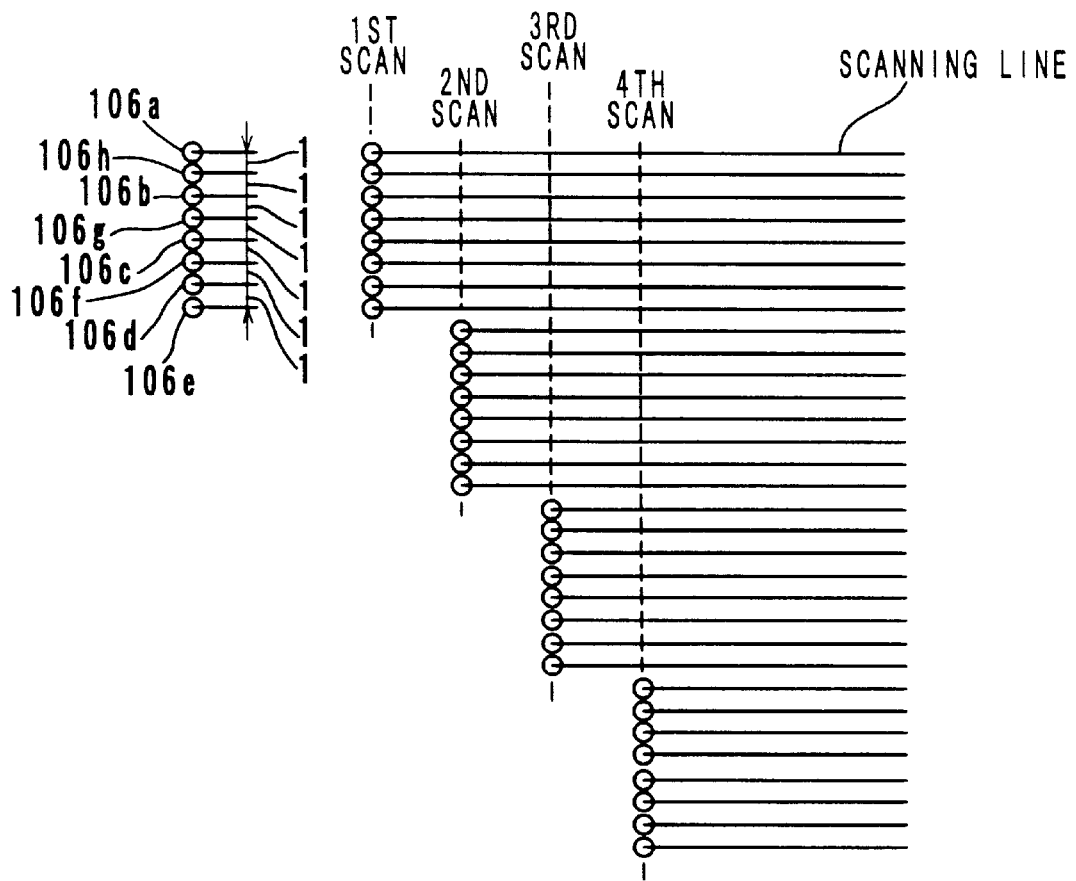
FIG. 26 is an illustration which shows scanning with the laser diode array shown in FIG. 25.

As shown in FIG. 25, the following is a description on a light source device employing a laser diode array 105 which has eight light emitting points 105a to 105h disposed on the circumference Q of a circle having its center on the optical axis C. The light emitting points 105a to 105h are disposed on the peripheral portion of the array at unequal intervals. As a result, the light emitting points 105a to 105h appear to be disposed at uniform intervals with respect to the direction of sub scanning, and as shown in FIG. 26, light beams emitted from the light emitting points 105a to 105h form light beam spots 106a to 106h on a photosensitive drum 25 at uniform intervals with respect to the direction of sub scanning. The image is formed on the photosensitive drum 25 by scanning sequentially from the front extremity of the image while simultaneously writing eight lines in one scanning operation with the light beam spots 106a to 106h.

Employed as the light source is one in which the arrangement of the light emitting points is two-dimensional or one-dimensional, one in which end-face light-emitting elements or surface light-emitting elements are used, or the like. More specifically, e.g., as shown in FIG. 27, two end-face light-emitting elements 401 and 402 may be disposed in parallel so that light emitting points 401a and 402a of the elements 401 and 402 are on the circumference Q of a circle having its center on the optical axis C. Alternatively, as shown in FIG. 28, a surface light-emitting element, on which light emitting points 405a are provided so as to form a lattice, may be disposed so that four out of the light emitting points 405a are positioned on the circumference Q of a circle having its center on the optical axis C.

In FIG. 29, light beam scanning optical apparatus generally comprise a light source unit 1, a cylindrical lens 11, a polygon mirror 12, three fθ-lenses 13, 14, 15, a cylindrical lens 16, a plane mirror 17, and a photosensitive drum 25.

The light source unit 1 comprises a laser diode array 2 and a collimator lens 5. The collimator lens 5 has a shape symmetrical with respect to its axis, which is positioned on the optical axis C of the scanning optical apparatus.

Figure 30:
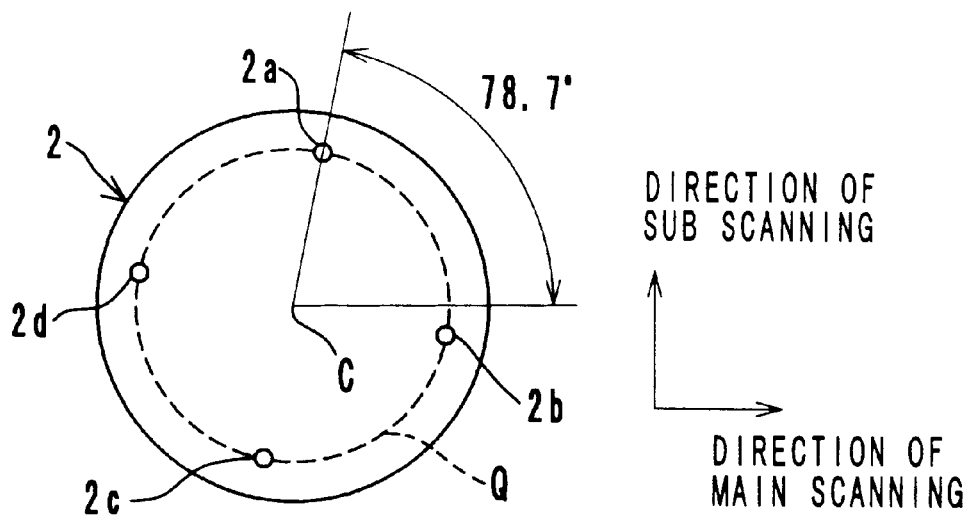
FIG. 30 is an illustration which shows a first example of arrangement of light emitting points on a laser diode array shown in FIG. 29.

The laser diode array 2 has a generally cylindrical shape, and as shown in FIG. 30 has four light emitting points 2a, 2b, 2c and 2d disposed on its peripheral portion at uniform intervals of 90 degrees. Accordingly, the positional relations between the light emitting points 2a to 2d are equivalent, and variations in temperature increase among the light emitting points 2a through 2d can be reduced. As a result, variations in quantity of light among light beams emitted from the light emitting points 2a through 2d are reduced. Besides, the light emitting points 2a to 2d are disposed on the circumference Q of a circle having its center on the axis of symmetry (the optical axis C) of the collimator lens 5. This arrangement makes the positions of the light emitting points 2a to 2d optically equivalent with respect to the collimator lens 5. Consequently, variations in convergence among the light beams emitted from the light emitting points 2a through 2d is restrained, so that the uniformity of image is improved.

As shown in FIG. 29, an output pinion 22 of a stepping motor 23 is in mesh with a rack 21 formed on the outer circumferential surface of the laser diode array 2. The laser diode array 2 can be rotated on the optical axis C in the directions along its outer circumference by the operation of the stepping motor 23 in forward or reverse direction. This rotation moves the four light emitting points 2a to 2d around the optical axis C so that the positions where light beams emitted from the light emitting points 2a to 2d are converged on the photosensitive drum 25 are adjusted and so that the image density is switched over.

Figure 31:
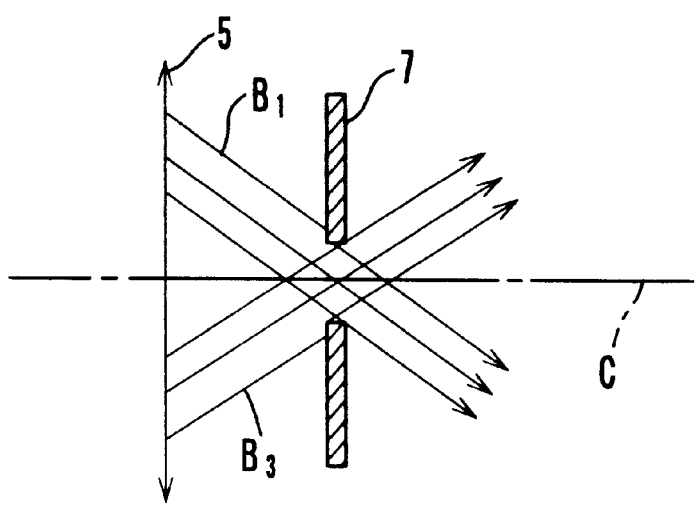
FIG. 31 is an illustration which shows a case that the diameter of a light beam is regulated.

Light beams $B_1$, $B_2$, $B_3$ and $B_4$ emitted from the laser diode array 2 are shaped into parallel (or convergent) bundles of rays by the collimator lens 5. The light beams $B_1$ to $B_4$ are emergent from the collimator lens 5 at spots on a circle having its center on the optical axis C. The aberrations of the light beams $B_1$ to $B_4$ emergent from the collimator lens 5 are generally equal and because the light emitting points 2a to 2d of the light beams $B_1$ to $B_4$ are at the positions which are optically equivalent with respect to the optical surface of the collimator lens 5 as described colve, the aberrations caused on the optical surface of the collimator lens 5 are the same. As a result, an image having an advantage in uniformity can be obtained. The light beams $B_1$ to $B_4$ are emergent from the collimator lens 5 at uniform angles to the optical axis C. In the case that an aperture 7 is disposed at the back focal point of the collimator lens 5 on the optical axis C in order to regulate the diameters of the light beams $B_1$ to $B_4$, e.g., as shown in FIG. 31, the light beams $B_1$ to $B_4$ undergo the same quantity of eclipse at all time by the aperture 7, and an image having an advantage in uniformity can be obtained. These effects remain invariant even though the light emitting points 2a to 2d are repositioned by the rotation of the laser diode array 2 in the circumferential direction with use of the stepping motor 23.

The light beams $B_1$ to $B_4$ emergent from the collimator lens 5 reach the polygon mirror 12 through the cylindrical lens 11. The cylindrical lens 11 converges the light beams $B_1$ to $B_4$ into the shapes of lines extending in the direction of main scanning, in the vicinity of a reflecting surface of the polygon mirror 12. The polygon mirror 12 is driven so as to rotate at a uniform angular speed in the direction of an arrow "a". The light beams $B_1$ to $B_4$ are deflected for scanning, at a uniform angular speed by the reflecting surfaces in response to the rotation of the polygon mirror 12. The beams $B_1$ to $B_4$ then pass through the fθ-lenses 13, 14, 15 and the cylindrical lens 16 and are reflected downward by the plane mirror 17. After that, the light beams $B_1$ to $B_4$ are focused on the photosensitive drum 25, which is scanned with the beams in the direction of an arrow "b". Thus, four lines are simultaneously written in one scanning operation in this optical system.

The fθ-lenses 13, 14 and 15 have a function of correcting distortion, i.e., a function of correcting the main scanning speed of the light beams $B_1$ to $B_4$ deflected at the uniform angular speed by the polygon mirror 12 to a constant speed on the photosensitive drum 25. The cylindrical lens 16 has a power only in the direction of sub scanning in the same way as the cylindrical lens 11. Both the lenses 11, 16 cooperate with each other to correct errors in perpendicularity of the reflecting surfaces of the polygon mirror.

The photosensitive drum 25 is driven so as to rotate at a uniform speed in the direction of an arrow "c", so that an image (an electrostatic latent image) is written on the photosensitive drum 25 by main scanning performed by the polygon mirror 12 and the fθ-lenses 13, 14 and 15 in the direction of the arrow "b", and by sub scanning performed by the photosensitive drum 25 in the direction of the arrow "c".

Hereinafter, the setting of the positions where the light beams $B_1$ to $B_4$ emitted from the light emitting points 2a to 2d on the laser diode array 2 are focused on the photosensitive drum 25 will be described.

The positions of the plurality of light beams are set so that scanning with the beams is simultaneously performed at unequal intervals with respect to the direction of sub scanning on the photosensitive drum 25. The positions are also set so that the following relational expressions (1) and (2) hold:

$$h_i \bmod n \neq 0 \tag{1}$$

$$h_i \bmod n \neq h_j \bmod n \tag{2}$$

$$(2 \leq i \leq n, 2 \leq j \leq n, i \neq j)$$

wherein $h_k$ ($2 \leq k \leq n$) is the position where the kth light beam from the front extremity of an image is focused, which position is measured with respect to the position where the first light beam from the front extremity of the image is focused on the photosensitive drum 25, and which position is expressed in units of the interval between scanning lines on the photosensitive drum 25 required by a given image density; and wherein "mod" is an operator for finding the remainder in the case that $h_i$ or $h_j$ is divided by n.

The relational expression (1) is a necessary condition for preventing the first light beam from the front extremity of the image from overwriting on a scanning line on which the image has been written by the preceding scanning operation.

The relational expression (2) is a necessary condition for preventing the kth light beam from the front extremity of the image from overwriting on a scanning line on which the image has been written by the preceding scanning operation.

Figure 32:
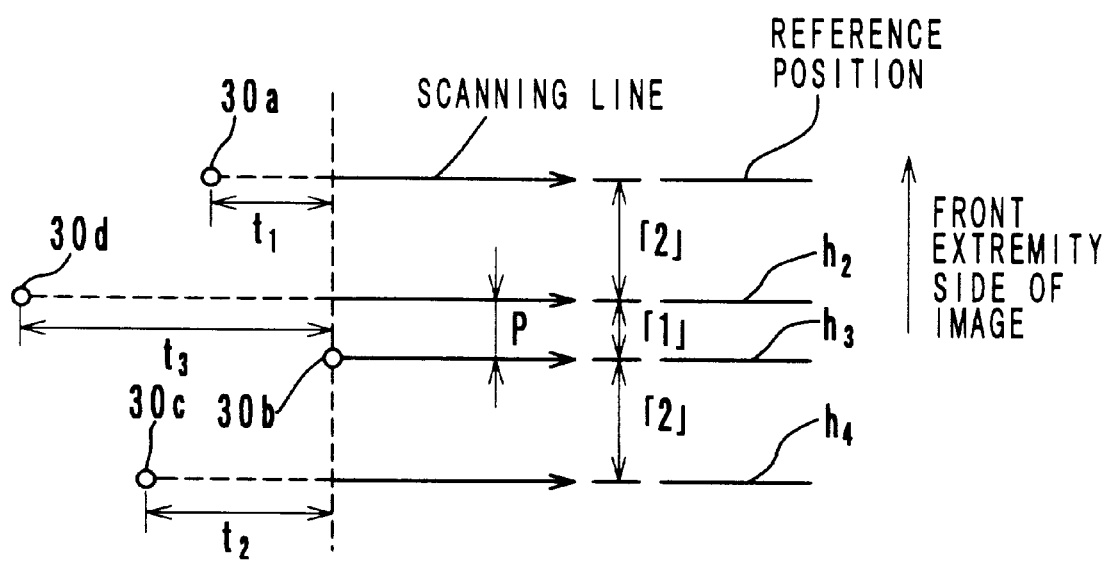
FIG. 32 is an illustration which shows the position of the beam spots on a scanning surface of light beams emitted from the light emitting points shown in FIG. 30.
Figure 33:
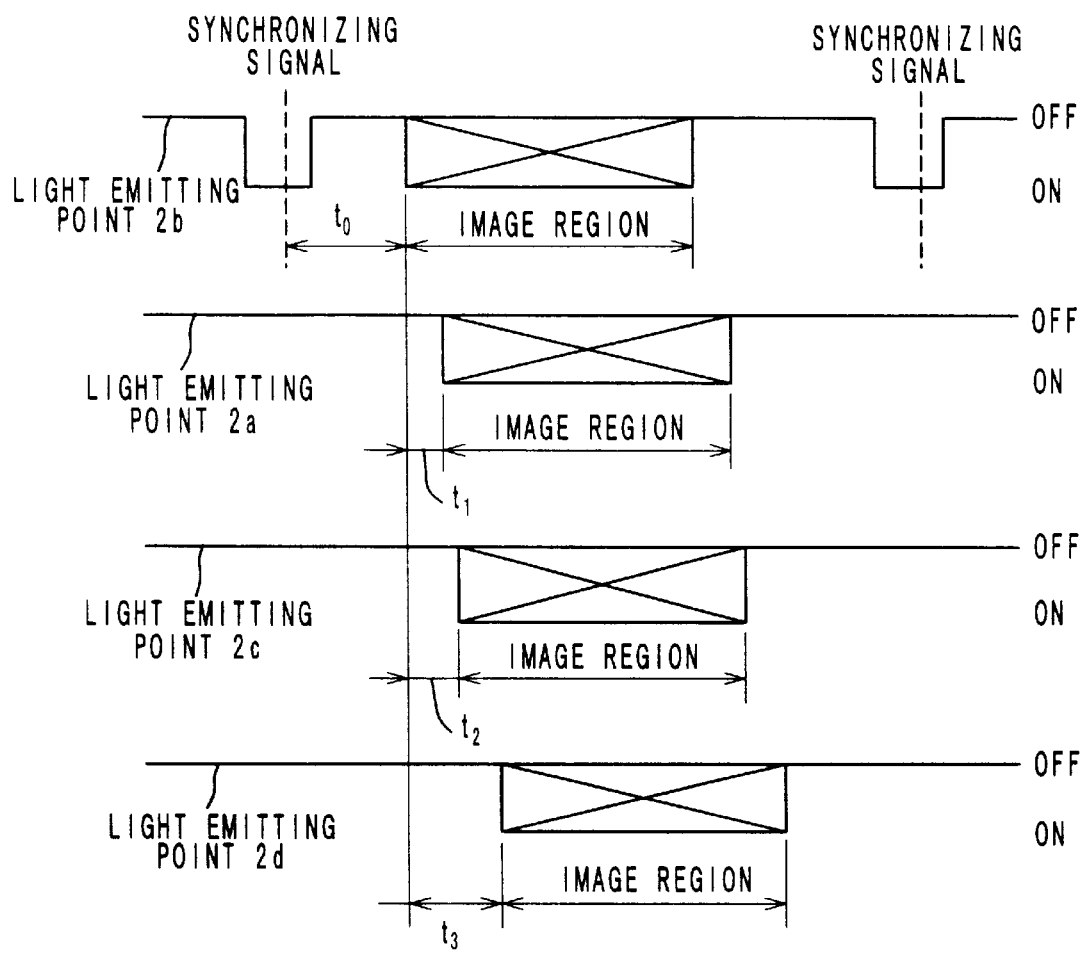
FIG. 33 is a timing chart for driving the light emitting points of the laser diode array.

Referring to FIGS. 30, 32 and 33, there will be described below a first example of adjustment of the positions where the four light beams $B_1$ to $B_4$ emitted from the laser diode array 2 are focused on the photosensitive drum 25 in the case that the image density achieved by the light beam scanning optical apparatus is set at 400 dpi.

As shown in FIG. 30, the laser diode array 2 is rotated in its circumferential direction with use of the stepping motor 23 until the line linking the light emitting point 2a and the optical axis C forms an angle of 78.7 degrees to the direction of main scanning. As a result, the light emitting points 2a to 2d appear to be disposed at unequal intervals with respect to the direction of sub scanning, and as shown in FIG. 32, the light beams $B_1$ to $B_4$ emitted from the light emitting points 2a to 2d are focused on the photosensitive drum 25 at unequal intervals with respect to the direction of sub scanning.

In this case, as to the intervals between light beam spots 30a to 30d of the light beams $B_1$ to $B_4$ on the photosensitive drum 25 with respect to the direction of sub scanning, the interval between the spots 30a and 30d and the interval between the spots 30b and 30c are represented as "2" and the interval between the spots 30d and 30b is represented as "1" providing the interval p(=63.4 μm (approximately 63.5 μm), corresponding to 400 dpi) between light beams required by an image density of 400 dpi is given as "1". Referred to the first scanning position from the front extremity of an image on the photosensitive drum 25, the second scanning position $h_2$ from the front extremity of the image is determined as "2", the third scanning position $h_3$ is determined as "3", and the fourth scanning position $h_4$ is determined as "5". Herein, the following relational expressions hold:

$h_2$ mod 4=2≠0

$h_3$ mod 4=3≠0

$h_4$ mod 4=1≠0

$h_2$ mod 4≠$h_3$ mod 4≠$h_4$ mod 4;

hence the above-mentioned relational expressions (1) and (2) hold.

In the laser diode array 2, the light emitting points 2a to 2d have different positions with respect to the direction of main scanning. Accordingly, the starting positions in a writing operation performed by the light emitting points 2a to 2d shift from one another with respect to the direction of main scanning, when light beams $B_1$ to $B_4$ are simultaneously emitted from the light emitting points 2a to 2d. In order to align the starting positions in a writing operation performed by the light emitting points 2a to 2d, the starts of the driving of the light emitting points 2a, 2c and 2d have to be delayed relative to the start of the driving of the light emitting point 2b. More specifically, as shown in FIG. 33, the driving of the referential light emitting point 2b is started on the basis of image data after the lapse of a time to since a vertical synchronizing signal for determining a starting position in printing is detected in each scanning operation. The driving of the light emitting points 2a, 2c and 2d is started on the basis of image data after the subsequent lapse of delay times $t_1$, $t_2$ and $t_3$, respectively. Thus, in the light beam scanning optical apparatus, the starting positions in writing are aligned.

Figure 34:
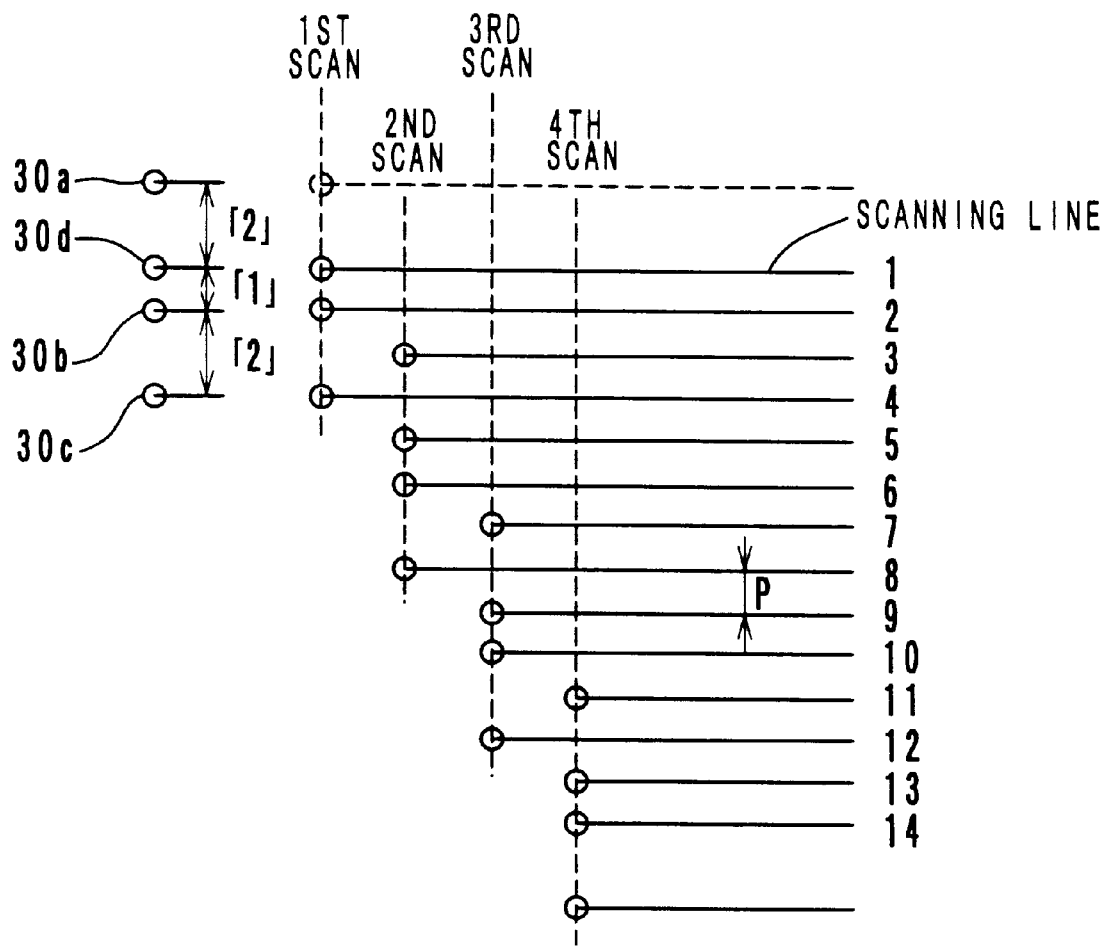
FIG. 34 is an illustration which shows scanning with the light beam spots shown in FIG. 32.
Figure 35:
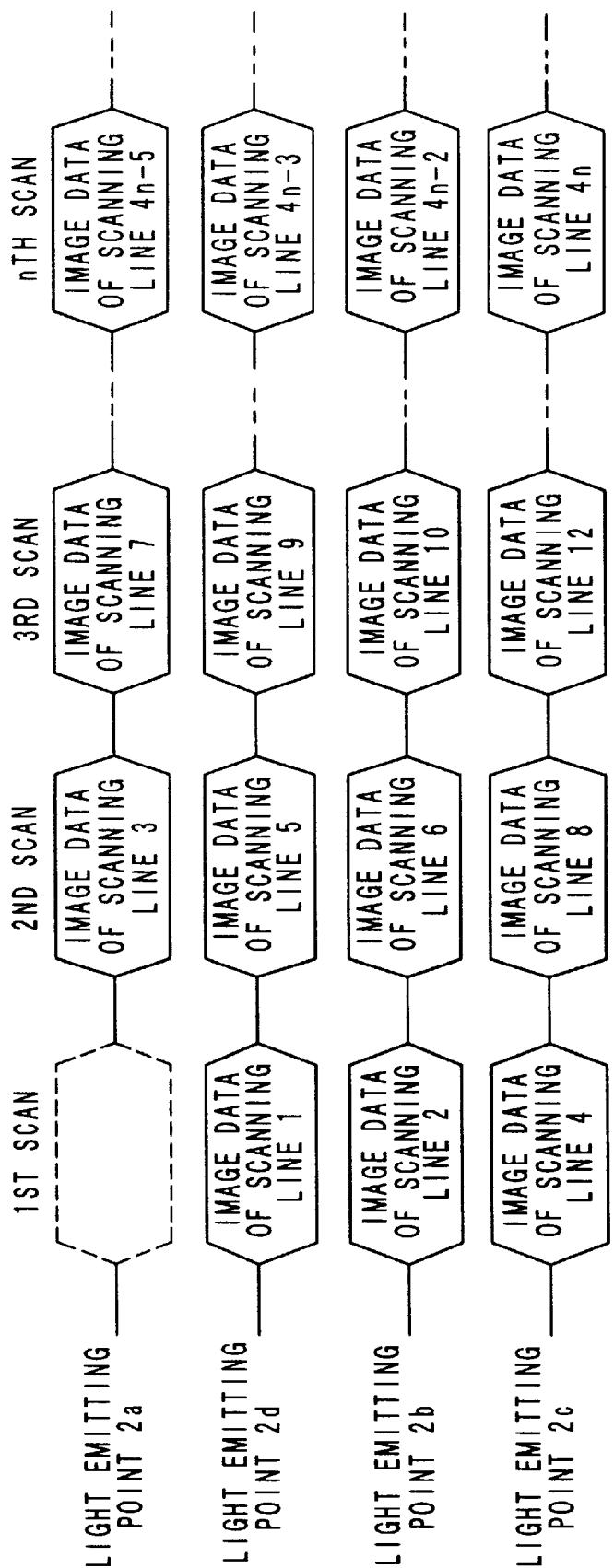
FIG. 35 is an illustration which shows image data which is transmitted to the light emitting points of the laser diode array.

Referring to FIGS. 34 and 35, the writing of an image on the photosensitive drum 25 by the laser diode array 2 set as described above will be described below.

As shown in FIG. 34, the light beams $B_1$ to $B_4$ emitted from the light emitting points 2a to 2d form the beam spots 30a to 30d on the photosensitive drum 25 at unequal intervals with respect to the direction of sub scanning. Interlaced scanning is performed with the beam spots 30a to 30d as follows: In a first scanning operation, the light emitting points 2b to 2d are lighted with the light emitting point 2a being unlighted. At this time, the light emitting point 2d is driven on the basis of the image data of a scanning line 1, the light emitting point 2b is driven on the basis of the image data of a scanning line 2, and the light emitting point 2c is driven on the basis of the image data of a scanning line 4 (see FIG. 35). The light emitting point 2a is unlighted for preventing a failure in scanning at the front extremity portion of the image.

In a second scanning operation, all the light emitting points 2a to 2d are lighted. At this time, the light emitting point 2a is driven on the basis of the image data of a scanning line 3, the light emitting point 2d is driven on the basis of the image data of a scanning line 5, the light emitting point 2b is driven on the basis of the image data of a scanning line 6, and the light emitting point 2c is driven on the basis of the image data of a scanning line 8 (see FIG. 35). After that, third, fourth and the following scanning operations continue.

Thus, the four light beam spots 30a to 30d form an image on the photosensitive drum 25, while the spot 30c writes on a scanning line ahead of a scanning line to be written by the spot 30a in the later scanning operation. Consequently, the image can be formed on the photosensitive drum 25 without occurrence of overwrite and of a failure in scanning, though the light beam spots 30a to 30d are arranged at unequal intervals with respect to the direction of sub scanning. With the arrangement in which the light beam spots 30a to 30d on the photosensitive drum 25 are positioned at unequal intervals with respect to the direction of sub scanning, the setting of the intervals between the light emitting points 2a to 2d becomes more flexible, and the shapes and arrangement of the polygon mirror 12, the fθ-lenses 13 to 15, and the like can be optimized without restraint.

As shown in FIG. 36, a circuit for driving the laser diode array 2 generally comprises a RAM 41 for storing image data, a controller 42 for controlling the laser diode array 2, and drivers 43 for driving the light emitting points 2a to 2d. When an instruction signal for rearranging image data is inputted from a host computer 40 through an interface (I/F) into the RAM 41, image data which has been arranged in numerical order starting from the scanning line 1 and has been stored in the RAM 41 is taken and transmitted to the controller 42 in a sequence shown in FIG. 34, in each scanning operation. The controller 42 outputs image data for each scanning line after the lapse of a predetermined delay time with use of a delay circuit 42a. The image data signals outputted from the controller 42 sequentially with delays are respectively transmitted to the drivers 43, which sequentially drive the corresponding light emitting points 2a to 2d.

Referring to FIGS. 37 to 40, there will be described below a second example of the adjustment of the positions where the four light beams $B_1$ to $B_4$ are focused on the photosensitive drum 25 in the case that the image density achieved by the light beam scanning optical apparatus is switched to 600 dpi.

Figure 37:
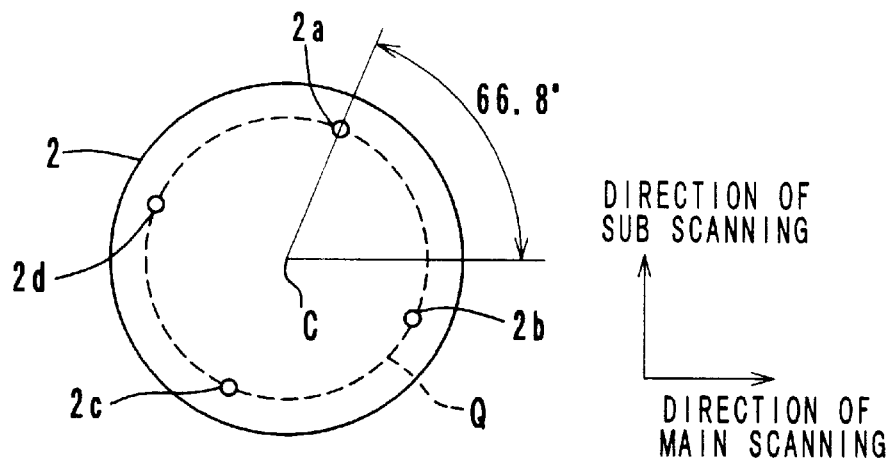
FIG. 37 is an illustration which shows a second example of arrangement of light emitting points on the laser diode array shown in FIG. 29.
Figure 38:
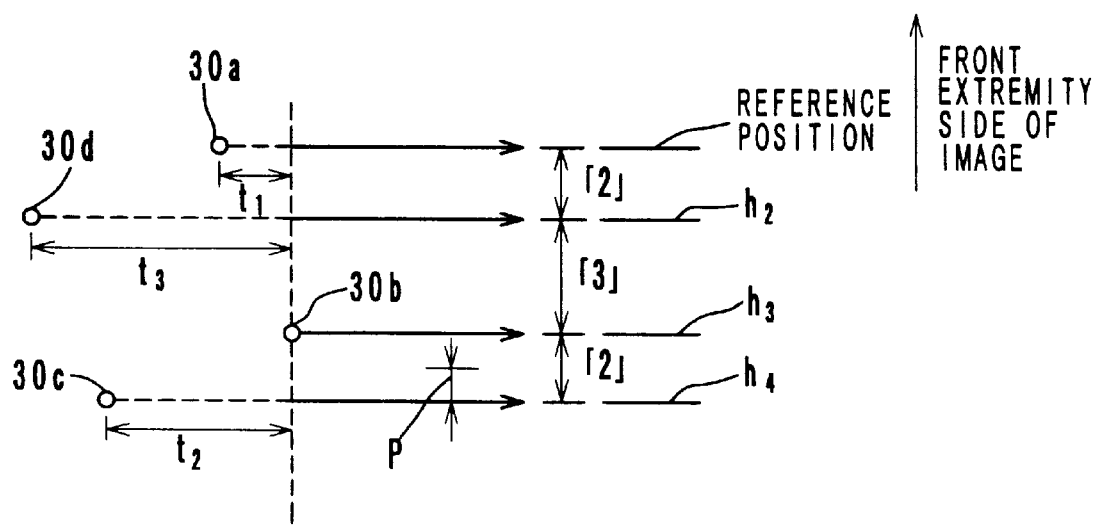
FIG. 38 is an illustration which shows the positions of the beam spots on a scanning surface of light beams emitted from the light emitting points shown in FIG. 37.

As shown in FIG. 37, the laser diode array 2 is rotated in its circumferential direction with use of the stepping motor 23 until the line linking the light emitting point 2a and the optical axis C forms an angle of 66.8 degrees to the direction of main scanning. As a result, the light emitting points 2a to 2d appear to be disposed at unequal intervals with respect to the direction of sub scanning, and as shown in FIG. 38, the light beams $B_1$ to $B_4$ emitted from the light emitting points 2a to 2d form light beam spots 30a to 30d on the photosensitive drum 25 at unequal intervals with respect to the direction of sub scanning. As for the intervals between the spots 30a to 30d, the interval between the spots 30a and 30d and the interval between the spots 30b and 30c are represented as "2", and the interval between the spots 30d and 30b is represented as "3", providing the interval p(=42.4 μm(approximately 42.3 μm), corresponding to 600 dpi) between light beams required by the image density of 600 dpi is given as "1". Referred to the first scanning position from the front extremity of the image on the photosensitive drum 25, the second scanning position $h_2$ from the front extremity of the image is determined as "2", the third scanning position $h_3$ is determined as "5", and the fourth scanning position $h_4$ is determined as "7". Herein, the following relational expressions hold:

$$h_2 \bmod 4 = 2 \neq 0$$

$$h_3 \bmod 4 = 1 \neq 0$$

$$h_4 \bmod 4 = 3 \neq 0$$

$$h_2 \bmod 4 \neq h_3 \bmod 4 \neq h_4 \bmod 4;$$

hence the above-mentioned relational expressions (1) and (2) hold.

Figure 39:
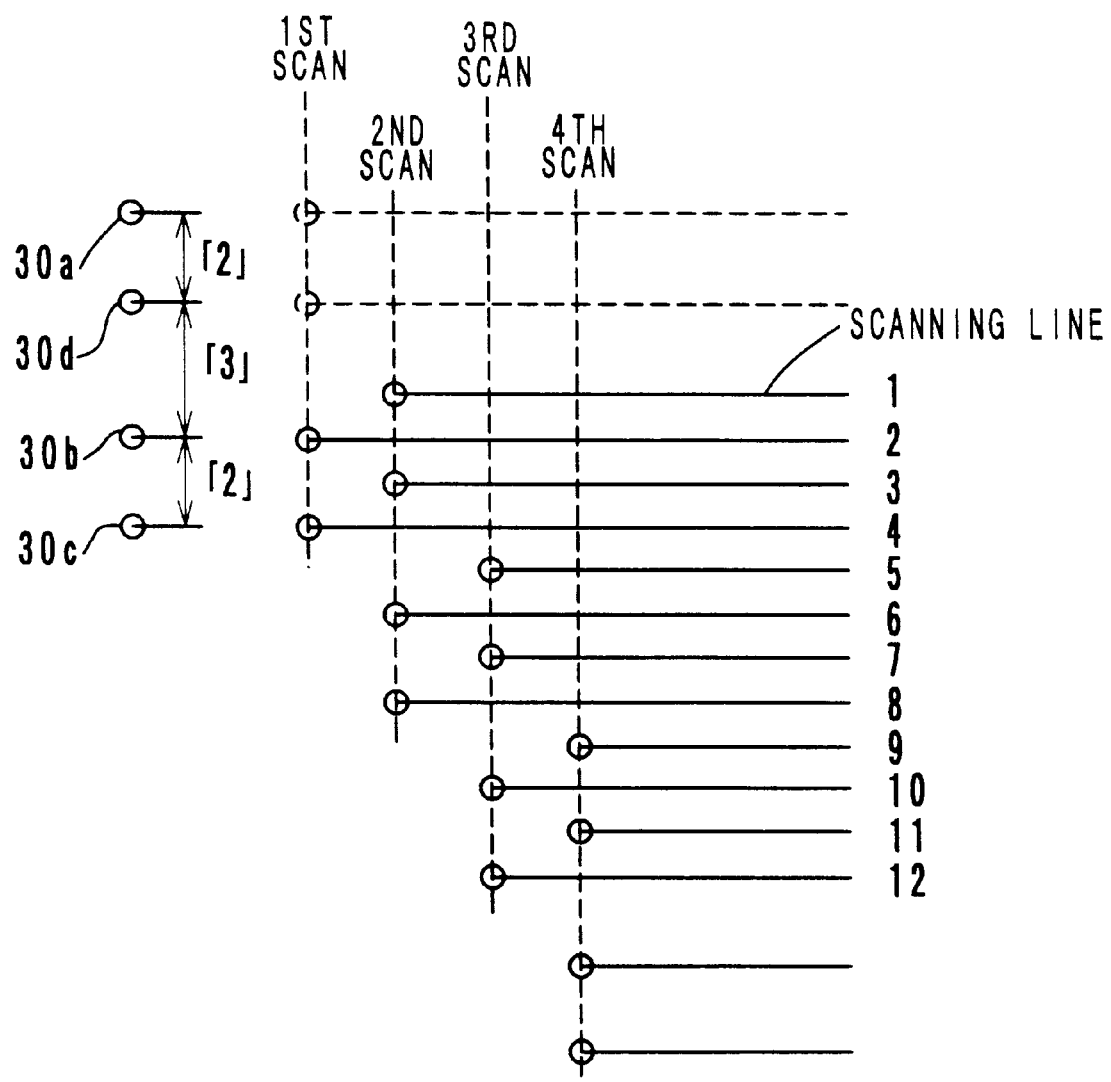
FIG. 39 is an illustration which shows scanning with the light beam spots shown in FIG. 38.
Figure 40:
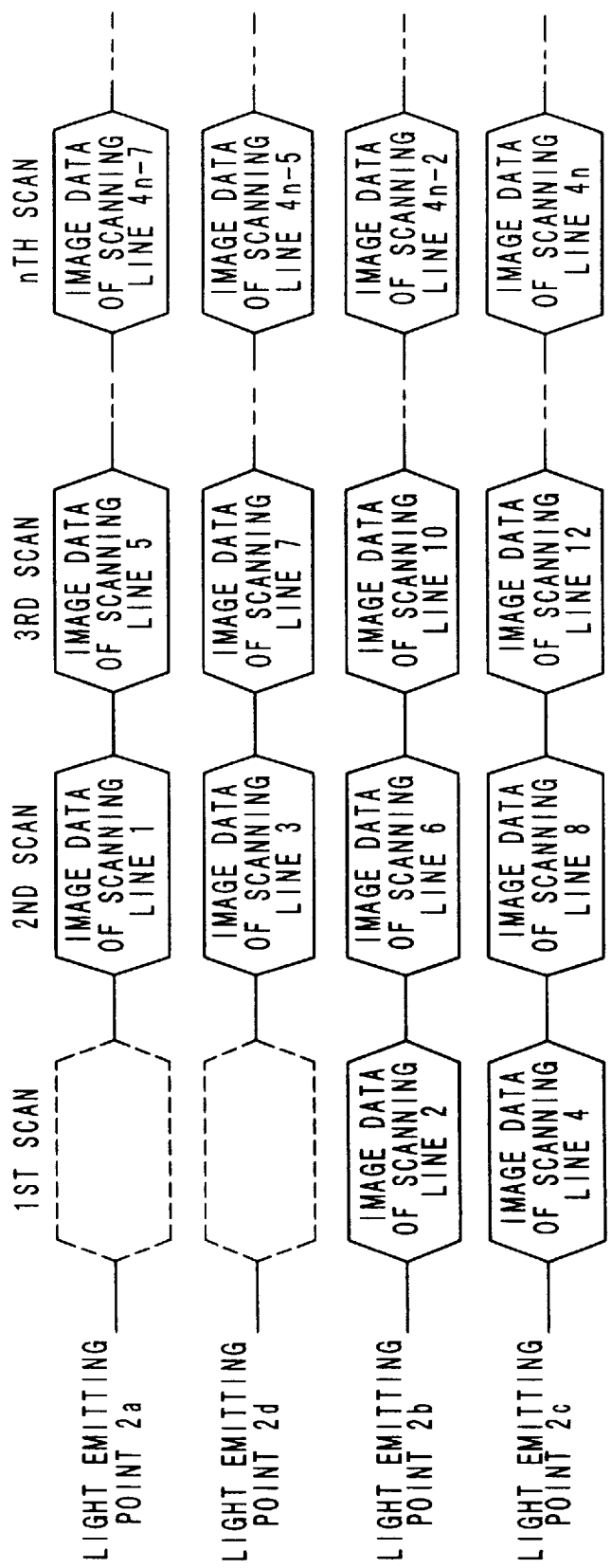
FIG. 40 is an illustration which shows image data which is transmitted to the light emitting points of the laser diode array.

Referring to FIG. 39, the writing of an image on the photosensitive drum 25 by the laser diode array 2 set as described above will be described below.

In a first scanning operation, the light emitting points 2b and 2c are lighted with the light emitting points 2a and 2d being unlighted. At this time, the light emitting point 2b is driven on the basis of the image data of a scanning line 2, and the light emitting point 2c is driven on the basis of the image data of a scanning line 4 (see FIG. 40). In a second scanning operation, all the points 2a to 2d are lighted. At this time, the light emitting point 2a is driven on the basis of the image data of a scanning line 1, the light emitting point 2b is driven on the basis of the image data of a scanning line 6, the light emitting point 2c is driven on the basis of the image data of a scanning line 8, and the light emitting point 2d is driven on the basis of the image data of a scanning line 3 (see FIG. 40). Such a rearranging process on image data is performed according to the instruction signal from the host computer 40 shown in FIG. 36, as described above. Thus the image is formed on the photosensitive drum 25 by interlaced scanning with the four light beam spots 30a to 30d.

Figure 41:
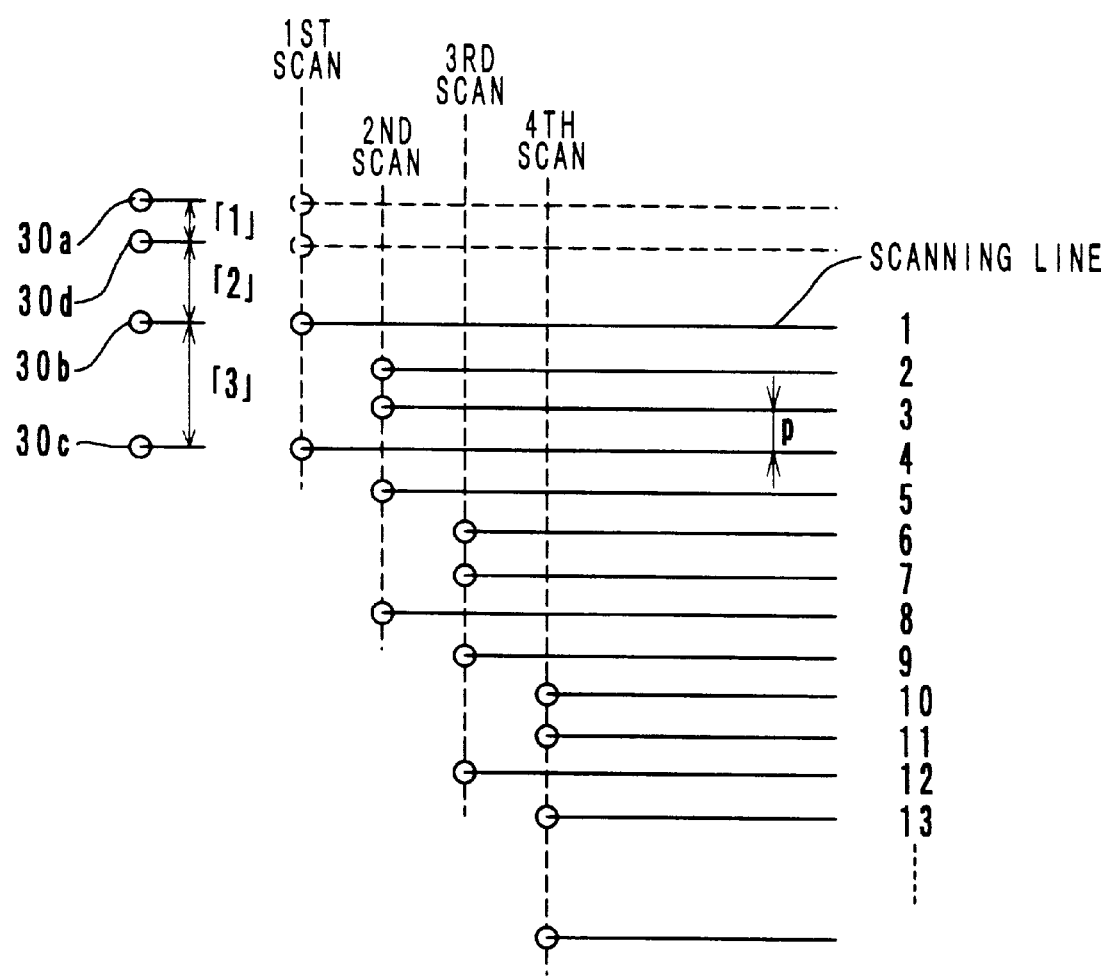
FIG. 41 is an illustration which shows scanning with a third example of light beam spots.

As shown in FIG. 41, a third example will be described below in which light beam spots 30a to 30d of the light beams $B_1$ to $B_4$ on the photosensitive drum 25 are formed at unequal intervals with respect to the direction of sub scanning. As for the intervals between the spots 30a to 30d, the interval between the spots 30a and 30d is represented as "1", the interval between the spots 30d and 30b is represented as "2", and the interval between the spots 30b and 30c is represented as "3", providing the interval p between light beams required by a desired image density is given as "1"; herein, the above-mentioned relational expressions (1) and (2) hold. The image is formed on the photosensitive drum 25 by interlaced scanning with the light beam spots 30a to 30d.

Hereinafter a light beam scanning optical apparatus comprising a light source unit 1 shown in FIG. 42 will be described. The light beam scanning optical apparatus forms an image of 400 dpi.

As shown in FIG. 43, the light source unit 1 comprises a laser diode 51 having one light emitting point 51a, a laser diode array 52 having two light emitting points 52a and 52b, a polarizing element 53, a beam coupling device 54 and a collimator lens 5. The laser diode 51 and the laser diode array 52 are disposed so that the polarization direction of a light beam $B_1$ which has been emitted from the laser diode 51 and has outgone from the beam coupling device 54 is orthogonal to the polarization direction of light beams $B_2$ and $B_3$ which have been emitted from the laser diode array 52 and have outgone from the beam coupling device 54. In this embodiment, the laser diode 51 and the laser diode array 52 are disposed so that the direction in which the light beam $B_1$ is emitted and the direction in which the light beams $B_2$ and $B_3$ are emitted are orthogonal to each other.

The polarization direction of the light beam $B_1$ emitted from the light emitting point 51a is rotated by 90 degrees by the polarizing element 53 such as a half-wave plate, and then the beam $B_1$ is guided to the beam coupling device 54. The beam coupling device 54 is a polarizing beam splitter; that is, the device 54 comprises two prisms joined through a filter film which has a polarization characteristic. The polarized light beam $B_1$ is reflected by the filter film at a right angle and is shaped into a parallel (or convergent) bundle of rays by the collimator lens 5. The light beams $B_2$ and $B_3$ emitted from the light emitting points 52a, 52b pass through the filter film in the beam coupling device 54 and travel straight. Then, the beams $B_2$ and $B_3$ are shaped into a parallel (or convergent) bundle of rays by the collimator lens 5.

The polarization characteristic of the filter film in the beam coupling device 54 will be described below.

In this embodiment, the beam coupling device 54 is provided with a filter film which transmits light beams having a linear polarization characteristic to oscillate in the direction parallel to the direction of sub scanning and which reflects light beams having a linear polarization characteristic to oscillate in the direction orthogonal to the direction of sub scanning. Thus, all the light beams $B_1$ to $B_3$ emitted from the light emitting points 51a, 52a and 52b are made into linear-polarized light beams oscillating in the direction parallel to the direction of sub scanning. With this arrangement, the light beams $B_1$ to $B_3$ emitted from the light emitting points 51a, 52a and 52b are used without loss, for forming an image. Accordingly, the voltages for driving the laser diode 51 and laser diode array 52 as the light sources can be set relatively low; this feature offers advantages in power consumption, heat production and the like.

The light beams $B_1$ to $B_3$ are coupled by the beam coupling device 54 so as to travel in the same direction while adjoining one another at unequal intervals with respect to the direction of sub scanning. At this time, the light beam $B_1$ is positioned between the light beams $B_2$ and $B_3$.

The light beams $B_1$ to $B_3$ from the collimator lens 5 travel by way of a cylindrical lens 11, a polygon mirror 12, fθ-lenses 13 to 15, a cylindrical lens 16, and a plane mirror 17 to be focused on a photosensitive drum 25.

Figure 44:
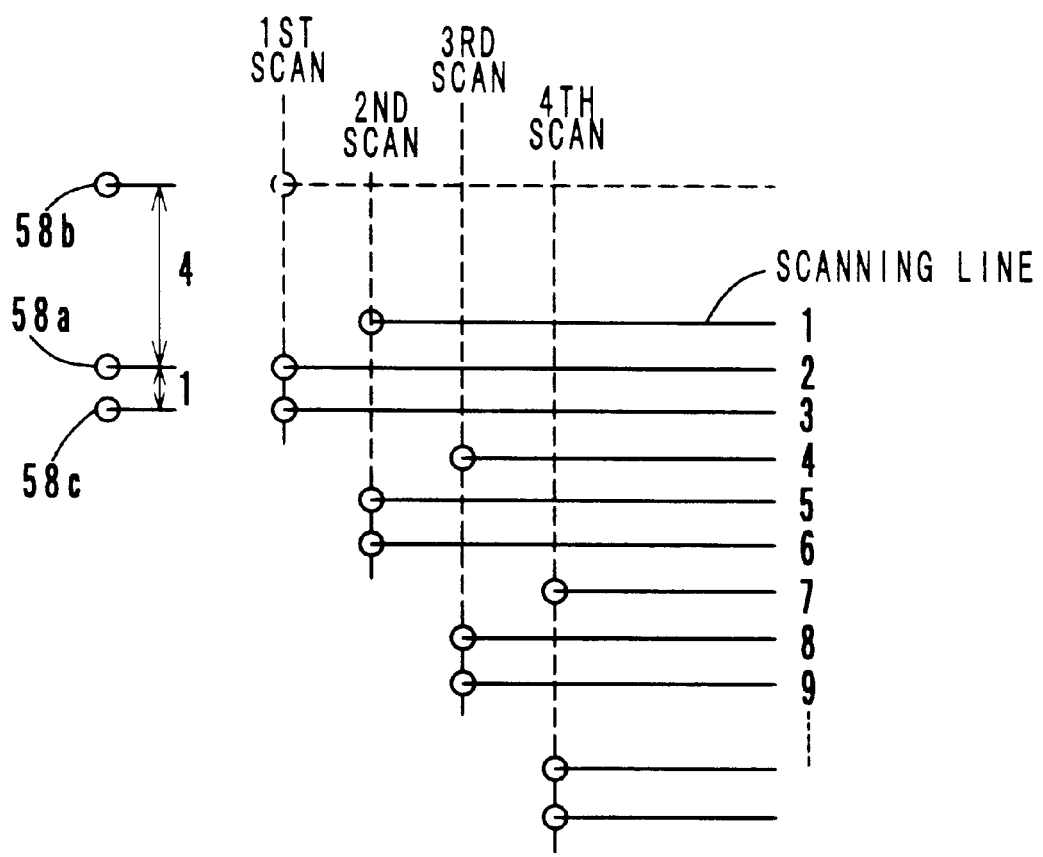
FIG. 44 is an illustration which shows scanning with light beams emitted from the light source unit shown in FIG. 43.

As shown in FIG. 44, as to light beam spots 58a, 58b, and 58c which are formed on the photosensitive drum 25 by light beams $B_1$, $B_2$ and $B_3$ emitted from the light emitting points 51a, 52a and 52b of the laser diode 51 and the laser diode array 52, the interval between the spots 58b and 58a is represented as "4", and the interval between the spots 58a and 58c is represented as "1", providing the interval p(=63.4 μm (approximately 63.5 μm), corresponding to 400 dpi) between light beams required by an image density of 400 dpi is given as "1". Herein, the above-mentioned relational expressions (1) and (2) hold. An image is formed on the photosensitive drum 25 by interlaced scanning with the light beam spots 58a to 58c. As a result, the setting of the intervals between the light beam spots 58a to 58c on the photosensitive drum 25 becomes more flexible, and the shapes and arrangement of the polygon mirror 12, the fθ-lenses 13 to 15 and the like can be optimized without restraint.

The light source unit 1 is constituted of two elements, i.e., the laser diode 51 and the laser diode array 52, and therefore the interval between the light emitting points 52a and 52b of the laser diode array 52 can be made larger than the interval between light emitting points in a light source constituted of a single laser diode array, so that the influence of thermal crosstalk can be reduced. Additionally, with respect to the direction of sub scanning, the beam spot 58a which is formed on the photosensitive drum 25 by the light beam $B_1$ emitted from the laser diode 51 is positioned between the beam spots 58b and 58c which are formed by the light beams $B_2$ and $B_3$ emitted from the laser diode array 52, and therefore the intervals between the light emitting points 51a, 52a and 52b can be decreased in appearance. As a result, the intervals between the light beams $B_1$ to $B_3$ on the photosensitive drum 25 can be decreased even though the interval between the light emitting points 52a and 52b is comparatively large, so that the thermal crosstalk between the light emitting points 52a and 52b can be further reduced.

The light beam coupling device may be a non-polarizing half mirror or the like, instead of a filter mirror which has a polarization characteristic. Such non-polarizing half mirror or the like requires not optical elements for rotating the polarization direction of a light beam. Besides, the position or positions where a light beam or light beams emitted from a first light source are focused on a scanning surface do not necessarily have to be positioned between the positions where a plurality of light beams emitted from a second light source are focused.

Figure 45:
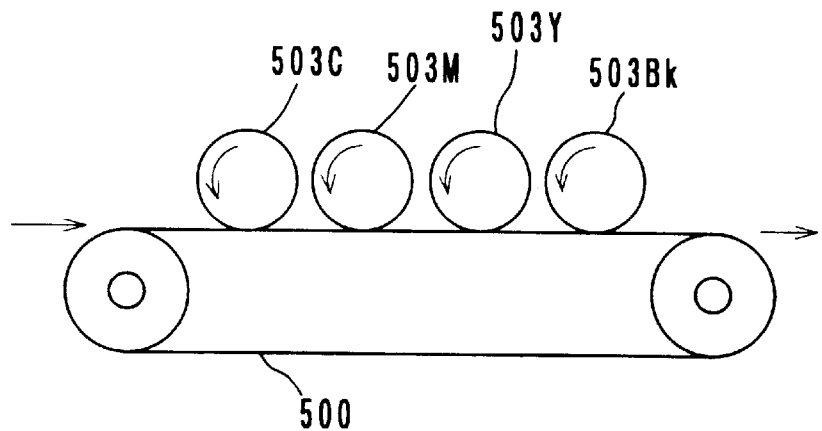
FIG. 45 is a schematic view of another type of light beam scanning optical apparatus in accordance with the invention.

As shown in FIG. 45, the invention can be effectively applied to a tandem type light beam scanning optical apparatus in which photosensitive members 503C, 503M, 503Y and 503Bk, e.g., for cyan, magenta, yellow and black, respectively, are arranged in a row so as to face a transfer belt. In FIG. 45, the reference numeral 500 designates the transfer belt.

Figure 46:
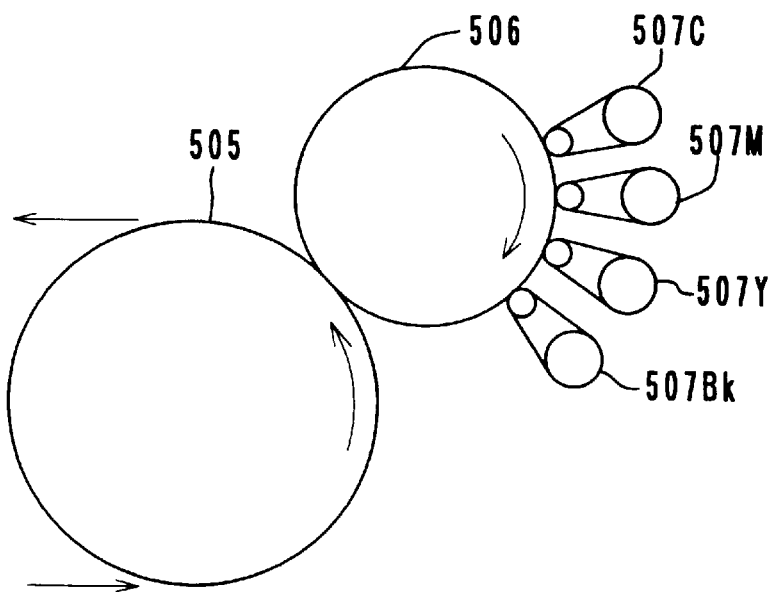
FIG. 46 is a schematic view of another type of light beam scanning optical apparatus in accordance with the invention.
Figure 47:
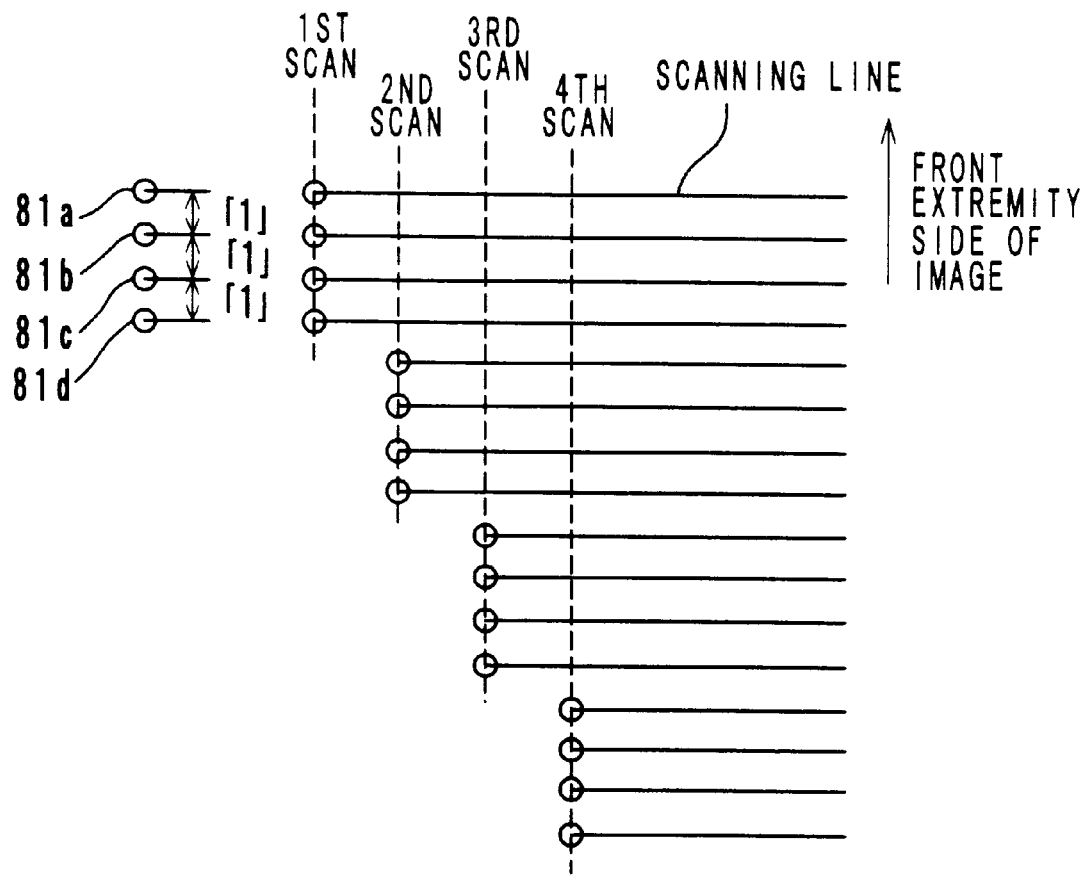
FIG. 47 is an illustration which shows sequential scanning operations performed by a light beam scanning optical apparatus.

Additionally, as shown in FIG. 46, the invention can be effectively applied to a light beam scanning optical apparatus comprising a transfer drum 505, a photosensitive drum 506, and developing devices 507C, 507M, 507Y and 507Bk for cyan, magenta, yellow and black, respectively, which devices surround the photosensitive drum 506.

Although the present invention has been described in connection with the preferred embodiments above, it is to be noted that various changes and modifications are apparent to a person skilled in the art. Such changes and modifications are to be understood as being within the scope of the present invention.

What is claimed is:

1. A light beam scanning optical apparatus comprising:
   a light source having at least three light emitting points;
   a converging lens for shaping light beam emitted from the light source, into at least one of generally parallel and convergent bundles of rays;
   a deflecting device for performing the deflection of and scanning with the light beams having outgone from the converging lens;
   a scanning surface which is to be illuminated by the light beams; and
   scanning optical elements for performing linear scanning on the scanning surface, with the light beams having outgone from the deflecting device;
   wherein scanning with light beams of which the number is n and which have been emitted from the light source is simultaneously performed at unequal intervals with respect to a direction of sub scanning on the scanning surface, and following relational expressions hold:

$h_i \bmod n \ne 0$ $h_i \bmod n \ne h_j \bmod n$ $(2 \le i \le n, 2 \le j \le n, i \ne j)$ wherein $h_k$ ($2 \le k \le n$) is a position where kth light beam from a front extremity of an image is converged, which the position is measured with respect to the position where the first light beam from the front extremity of the image is converged on the scanning surface, and which position is expressed in units of an interval between scanning lines required by a given image density on the scanning surface, and wherein mod is an operator for finding remainder in the case that $h_i$ or $h_j$ is divided by n.

2. A light beam scanning optical apparatus comprising:
   a light source having at least three light emitting points;
   a converging lens for shaping light beam emitted from the light source, into at least one of generally parallel and convergent bundles of rays;
   a deflecting device for performing the deflection of and scanning with the light beams having outgone from the converging lens;
   a scanning surface which is to be illuminated by the light beams; and
   scanning optical elements for performing linear scanning on the scanning surface, with the light beams having outgone from the deflecting device;
   wherein scanning with light beams of which the number is n and which have been emitted from the light source is simultaneously performed at unequal intervals with respect to a direction of sub scanning on the scanning surface, and following relational expressions hold:

$h_i \bmod n \ne 0$ $h_i \bmod n \ne h_j \bmod n$ $(2 \le i \le n, 2 \le j \le n, i \ne j)$ wherein $h_k$ ($2 \le k \le n$) is a position where kth light beam from a front extremity of an image is converged, which the position is measured with respect to the position where the first light beam from the front extremity of the image is converged on the scanning surface, and which position is expressed in units of an interval between scanning lines required by a given image density on the scanning surface, and wherein mod is an operator for finding remainder in the case that $h_i$ or $h_j$ is divided by n; and
   wherein the converging lens has a shape generally symmetrical with respect to the optical axis thereof and the light emitting points on the light source are disposed on a circle having its center generally on the optical axis.

3. A light beam scanning optical apparatus comprising:
   a light source having at least three light emitting points;
   a converging lens for shaping light beam emitted from the light source, into at least one of generally parallel and convergent bundles of rays;
   a deflecting device for performing the deflection of and scanning with the light beams having outgone from the converging lens;

a scanning surface which is to be illuminated by the light beams; and scanning optical elements for performing linear scanning on the scanning surface, with the light beams having outgone from the deflecting device;

wherein scanning with light beams of which the number is n and which have been emitted from the light source is simultaneously performed at unequal intervals with respect to a direction of sub scanning on the scanning surface, and following relational expressions hold:

$h_i \bmod n \neq 0$ $h_i \bmod n \neq h_j \bmod n$ $(2 \leq i \leq n, 2 \leq j \leq n, i \neq j)$ wherein $h_k$ ($2 \leq k \leq n$) is a position where kth light beam from a front extremity of an image is converged, which the position is measured with respect to the position where the first light beam from the front extremity of the image is converged on the scanning surface, and which position is expressed in units of an interval between scanning lines required by a given image density on the scanning surface, and wherein mod is an operator for finding remainder in the case that $h_i$ or $h_j$ is divided by n; and wherein the light source having at least three light emitting points comprises a first light source having one light emitting point, a second light source having a plurality of light emitting points, and the light beams emitted from the light emitting points have a shape generally symmetrical with respect to the optical axis thereof and the light emitting points are disposed on a circle having its center generally on the optical axis.

* * * * *